(12) United States Patent
Horita

(10) Patent No.: US 8,798,441 B2
(45) Date of Patent: Aug. 5, 2014

(54) RECORDING APPARATUS AND RECORDING SYSTEM

(71) Applicant: Panasonic Corporation, Osaka (JP)

(72) Inventor: Seiji Horita, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/790,203

(22) Filed: Mar. 8, 2013

(65) Prior Publication Data

US 2013/0259441 A1 Oct. 3, 2013

(30) Foreign Application Priority Data

Mar. 28, 2012 (JP) ................................. 2012-073216
Mar. 7, 2013 (JP) ................................. 2013-045751

(51) Int. Cl.
| | | |
|---|---|---|
| *H04N 5/92* | (2006.01) | |
| *H04N 21/854* | (2011.01) | |
| *H04N 21/8547* | (2011.01) | |
| *H04N 5/77* | (2006.01) | |
| *H04N 21/4223* | (2011.01) | |
| *H04N 9/79* | (2006.01) | |
| *H04N 9/82* | (2006.01) | |
| *H04N 5/765* | (2006.01) | |

(52) U.S. Cl.
CPC ........... *H04N 9/79* (2013.01); *H04N 21/85406* (2013.01); *H04N 21/8547* (2013.01); *H04N 5/772* (2013.01); *H04N 21/4223* (2013.01); *H04N 5/765* (2013.01); *H04N 9/8205* (2013.01)
USPC .......................................... 386/248; 386/239

(58) Field of Classification Search
None
See application file for complete search history.

(56) References Cited

U.S. PATENT DOCUMENTS

| | | | | |
|---|---|---|---|---|
| 2005/0149572 | A1* | 7/2005 | Kanai et al. ................ | 707/104.1 |
| 2006/0288027 | A1* | 12/2006 | Murakami et al. ............ | 707/101 |
| 2008/0239909 | A1* | 10/2008 | Takahashi et al. ......... | 369/53.21 |
| 2009/0129759 | A1 | 5/2009 | Mizuguchi et al. | |
| 2009/0228283 | A1* | 9/2009 | Toma et al. ................... | 704/500 |
| 2012/0133736 | A1* | 5/2012 | Nishi et al. ..................... | 348/43 |
| 2012/0237026 | A1* | 9/2012 | Sato et al. ..................... | 380/200 |

FOREIGN PATENT DOCUMENTS

| | | |
|---|---|---|
| JP | 2003-283900 A | 10/2003 |
| JP | 2006-352458 A | 12/2006 |

* cited by examiner

*Primary Examiner* — William C Vaughn, Jr.
*Assistant Examiner* — Eileen Adams
(74) *Attorney, Agent, or Firm* — Renner, Otto, Boisselle & Sklar, LLP

(57) ABSTRACT

An exemplary recording apparatus records video data and audio data in a recording medium in an MPEG4 file format. A first MPEG4 file format generating circuit generates MPEG4 data including multiplexing information on a multiplexing of the video data and the audio data stored in a MOOV BOX of the MPEG4 file format. A second MPEG4 file format generating circuit configured to: generate MPEG4 data including the multiplexing information stored in a MOOF BOX of the MPEG4 file format; store reproduction information required for reproducing the MPEG4 data generated by the first MPEG4 file format generating circuit from the generated MPEG4 data in a BOX of the MPEG4 file format for storing types of data that are ignored at a time of playing MPEG4 data; and to output the MPEG4 data to an external apparatus via the transmitting unit. A controller records the MPEG4 data in a recording medium.

21 Claims, 15 Drawing Sheets

SEPARATION INFORMATION OF AV

| ftyp | mdat | moov |

| ftyp | moov | moof | mdat | moof | mdat | ... | moof | mdat |

SEPARATION INFORMATION OF AV     SEPARATION INFORMATION OF AV     SEPARATION INFORMATION OF AV

FIG.18

HPX3100_0A1B2C3_10_00001_000000.mp4

① MODEL OF VIDEO CAMERA
② SERIAL NUMBER OF VIDEO CAMERA
③-1 STATUS OF VIDEO CAMERA (1=RECORDING, 0=STOP)
③-2 END FLAG OF FRAGMENT
④ UNIQUE NUMBER OF STREAM
⑤ SENT DATA SIZE
⑥ EXTENSION

– 1 –
RECORDING APPARATUS AND RECORDING SYSTEM

BACKGROUND

1. Technical Field

The present disclosure relates to a video camera for recording and transmitting a movie, and a receiving apparatus for receiving data of the movie transmitted from the video camera.

2. Description of the Related Art

In recent years, a network connection unit such as an Ethernet (trademark) and a wireless local area network (LAN) has been increasingly built in an imaging apparatus such as a video camera and a digital camera along with development and cost reduction in a data transmission technology using the Internet. In addition, a system for transferring a video taken by the video camera or the digital camera to a personal computer, a smart phone, or a server by using the network connection unit has also been brought into reality along with increase of a data transfer speed and a highly-efficient video compression technology.

For example, Japanese Patent Application Laid-open No. 2003-283900 discloses a digital camera that converts an image of a subject (image) input through a lens system into digital image data using an imaging element and stores the converted digital image data. This digital camera includes at least a memory card for storing the image data, a card slot into which a communication card for performing a communication to an outside via a communication line is insertable, a type detection unit for detecting a type of a card inserted into the card slot, and a communication unit for communicating to a predetermined file server via the communication line when the type detection unit detects that the communication card is connected to the card slot. This digital camera then transmits the image data to the file server by the communication unit. The above-mentioned Japanese Patent Application Laid-open No. 2003-283900 describes that, with this configuration, when the communication card is inserted into the digital camera, the image data can be stored in the file server by transmitting the image data obtained by photographing the subject to the file server via the communication line.

An embodiment in the above-mentioned Japanese Patent Application Laid-open No. 2003-283900 is a digital camera. However, along with the recent increase of the efficiency of the movie compression technology, it is also becoming easier to transfer a video taken by a video camera to a personal computer, a smart phone, or a server by using a communication card. There are various types of video formats, which are used for different purposes or the like.

SUMMARY

The present disclosure provides a recording apparatus that is configured to record a video (moving image) taken by a video camera by using, for example, an MPEG4 file format and to achieve compatibility of the file format when also recording the video at a destination for transmitting the video.

According to one embodiment of the present disclosure, there is provided a recording apparatus for recording video data and audio data in a recording medium in an MPEG4 file format, the recording apparatus comprising: a transmitting unit; a first MPEG4 file format generating circuit configured to generate MPEG4 data including multiplexing information of the video data and the audio data having stored in a MOOV BOX in the MPEG4 file format; a second MPEG4 file format generating circuit configured to: generate MPEG4 data including the multiplexing information having stored in a MOOF BOX in the MPEG4 file format; store reproduction information required for reproducing the MPEG4 data generated by the first MPEG4 file format generating circuit from the generated MPEG4 data in a BOX in the MPEG4 file format for storing type of data that is ignored at a time of playing; and output the MPEG4 data to an external apparatus via the transmitting unit; and a controller configured to record the MPEG4 data generated by the first MPEG4 file format generating circuit in a recording medium.

With the recoding apparatus according to the present disclosure, when recording a video (moving image) recorded by a video camera by using, for example, the MPEG4 file format and also recording the video at a transmission destination, a compatibility can be achieved between a file format of the video recorded by the recording apparatus and a file format of the video recorded by an apparatus of the transmission destination. For example, the data of the respective files can be exactly the same.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 18 is a diagram showing an example of a naming rule for a file name used for transferring according to an embodiment.

DETAILED DESCRIPTION

In the following, with reference to the attached drawings, exemplary embodiments of the present disclosure are described in detail. However, an overly detailed description may be omitted. For example, a detailed description of well-known matter or an overlapped description of the substantially same configuration may be omitted. This is to avoid an unnecessarily lengthy description to be made below so that a person of ordinary skill in the art can easily understand the present disclosure.

The inventors of the present disclosure provide the following description to help a person of ordinary skill in the art to fully understand the present disclosure, but do not intend to limit the subject matter described in the claims to the following description.

In the following, with reference to FIGS. 1 to 4, problems in this field of technology found by the inventors of the present disclosure thus far are described. Thereafter, the exemplary embodiments of the present disclosure are described.

In the present disclosure, a "movie" is intended to include video and audio. Therefore, "movie data" includes "video data" and "audio data". Further, a "movie file" means movie data stored in a recording medium in which a predetermined file system is built. The movie file is a unit of management for the movie data in the file system. The audio is not essential in the movie.

Figure 1:
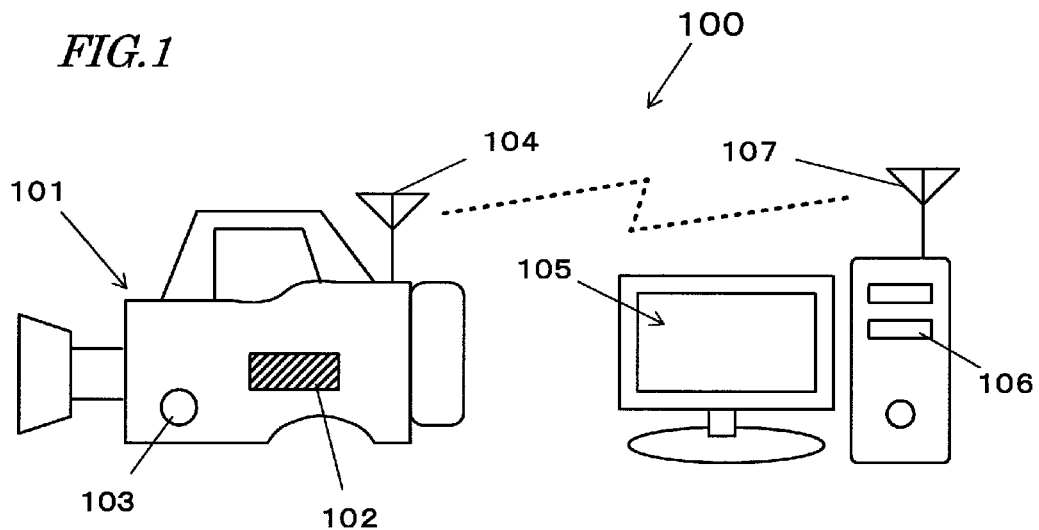
FIG. 1 is a diagram showing a configuration example of a video system including a video camera according to an embodiment.

FIG. 1 illustrates a configuration example of a video system 100 including a video camera. The configuration example illustrated in FIG. 1 is also referred to as a video system 100 including a video camera according to the present disclosure later.

The video system 100 includes a video camera 101 and a personal computer (PC) 105.

The video camera 101 of the video system 100 includes therein a recording medium 102. However, the recording medium 102 is not necessarily to be fixed to the video camera 101, but may be a removable recording medium.

The video camera 101 starts a recording of a movie file containing video and audio in the recording medium 102 in response to a recording start command issued by a user pressing a recording start button 103. In this case, an SD card or a hard disk is often used as a specific example of the recording medium 102. As a file format of the video written in the recording medium 102, the MPEG4 (ISO/IEC 14496-12:2008) is often used in recent years due to its high compression efficiency. When the user presses the recording start button 103 again, a recording end command is issued. Thus, the video camera 101 ends the recording of the movie file.

The video camera 101 further includes a wireless transmitting unit 104. The wireless transmitting unit 104 performs a wireless communication by a wireless transmitting unit 107 included in the PC 105. The video camera 101 transmits movie data being recorded to the PC 105 in real time via the wireless transmitting unit 104. The movie being taken by the video camera 101 is displayed on a screen of the PC 105 as a streaming. Specific examples of the wireless transmitting units 104 and 107 include communication units complying to communication standards such as the wireless LAN (for example, Wi-Fi standards), the Bluetooth, the Worldwide Interoperability for Microwave Access (WIMAX), and the long term evolution (LTE). However, the transmission is not necessarily to be performed in a wireless manner, but can be performed via a wired connection complying with the Ethernet (trademark) standards or the USB standards.

The PC 105 records received movie data in a recording medium 106 included therein in conjunction with the recording start/end of the video camera 101. That is, movie data having the same content as the movie data recorded in the recording medium 102 of the video camera 101 is also recorded in the recording medium 106 of the PC 105. This is to improve the reliability by a redundant recording on one hand, and to eliminate time and effort to copy the movie file by inserting the recording medium 102 in the PC 105 after the recording ends on the other hand.

However, the inventors of the present disclosure found that the following two problems occur in this case.

The first problem found by the inventors of the present disclosure relates to an MPEG4 file format. In the MPEG4 file format defined by ISO/IEC 14496-12:2008, information in the file is stored by being divided in units called "BOX". For example, there are provided MOOV BOX for storing basic information including a size of a screen or a type of a codec and MDAT BOX for storing compressed video data and audio data. Representative types of the BOX are shown in Table 1.

TABLE 1

| Type | Function |
| --- | --- |
| ftyp | Always appear at the head of a file. Content is fixed depending on a type of the file. |
| moov | Store basic information on video and audio. A type of compression, the number of included audio channels, etc. Appear only once in the entire file by necessity. |
| mdat | Store multiplexed data entity of compressed video and audio. |
| moof | Store information required to demultiplex the multiplexed video and audio in mdat. Unnecessary when the same information is described in moov. |
| free | Content is ignored when playing video and audio. |
| skip | Content is ignored when playing video and audio. |

In the MPEG4 file format, the compressed video data and audio data are stored in the MDAT BOX in a striping manner. That is, in this format, using only the information stored in the MDAT BOX, storage locations of the video data and the audio data cannot be determined. This is because separation information for separating the video data and the audio data is stored in a box other than the MDAT BOX. A player for playing the MPEG4 file separates and extracts the video data and the audio data from the MDAT BOX based on the separation information, and plays the video data and the audio data through a screen and a speaker, respectively.

Figure 2:
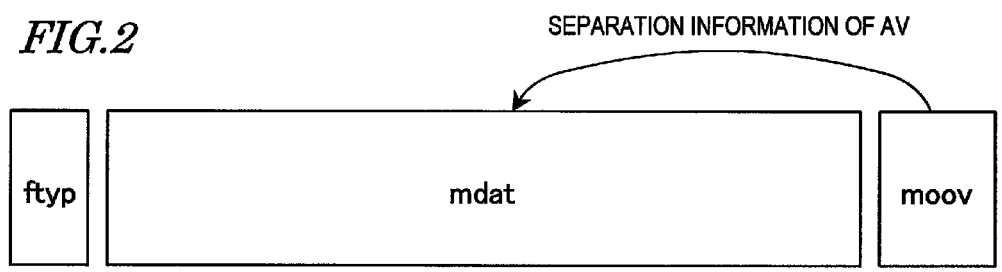
FIG. 2 is a diagram showing a configuration example of the file format based on the first method according to an embodiment.
Figure 3:
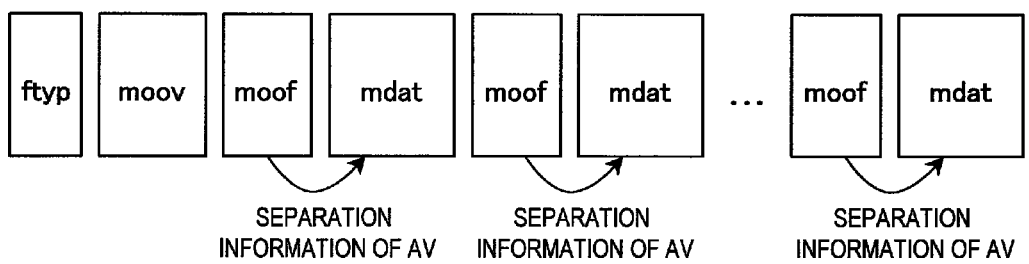
FIG. 3 is a diagram showing a configuration example of the file format based on the second method according to an embodiment.

In the MPEG 4 file format defined by ISO/IEC 14496-12:2008, two types of methods are mainly defined in order to store the separation information for separating the video data and the audio data. FIG. 2 illustrates a configuration example of the file format based on the first method, and FIG. 3 illustrates a configuration example of the file format based on the second method.

In the first method, the video data and the audio data are stored in a single MDAT BOX ("mdat" illustrated in FIG. 2), and all the separation information for separating the video data and the audio data is described in a MOOV BOX ("moov" illustrated in FIG. 2). Specifically, information on the multiplexing of the video and the audio is stored as information included below an STBL (Sample Table Box: Subclause 8.5 of ISO/IEC 14496-12:2008) included in the MOOV BOX.

When this method is used, the separation information for separating the video data and the audio data is collectively stored in a single place. Therefore, a random access to the video data and the audio data can be performed in a considerably easy manner. The reason is because it is promptly known which location of the MOOV BOX can enable an access to the corresponding video data in a predetermined time simply by interpreting a description in the MOOV BOX.

On the other hand, when this method is used, it is not possible for the video camera to generate an MPEG4 file to record in the recording medium of the video camera and simultaneously transmit the same data to a PC in real time to perform a streaming play of the video and the audio at the destination PC. The reason is because the MOOV BOX cannot be generated without determining all the separation information for separating the video data and the audio data, and hence the MOOV BOX is eventually placed at the tail of the movie file. For this reason, the destination PC cannot separate the video data and the audio data unless the movie file is all received. That is, the destination PC cannot play the movie file while receiving the movie file.

In the second method for storing the separation information for separating the video data and the audio data, as illustrated in FIG. 3, the video data and the audio data are stored in a plurality of MDAT BOXes ("mdat" illustrated in FIG. 3) in a divided manner, and the separation information for separating the video data and the audio data in each MDAT BOX is described in a MOOF BOX ("moof" illustrated in FIG. 3) paired with the MDAT BOX. Specifically, information on the multiplexing of the video and audio is stored as information included below a TRAF (Frack Fragment: Subclause 8.8.6 of ISO/IEC 14496-12:2008) included in the MOOF BOX. At this time, in the MOOV BOX, only basic information such as a size of a screen or a type of a codec is described, but the information on the separation of the video data and the audio data is not stored.

When this method is used, it is possible for the video camera to generate an MPEG4 file to record the movie data in the recording medium of the video camera and simultaneously transmit the same data to a PC in real time to perform a streaming play of the video and the audio at the destination PC. This is because the information on the separation of the video data and the audio data is sequentially transferred.

On the other hand, when this method is used, a random access to the video data and the audio data becomes rather complicated. This is because a reading of the separation information on the corresponding video data in a predetermined time requires interpreting the configuration of all BOXes from the head of the file, extracting only the MOOF BOXes, and reading the extracted MOOF BOXes one by one.

Summing up the above-mentioned aspects, it can be said that the file format by the first method (hereinafter referred to as "MPEG4 first format") is suitable for recording in a recording medium an MPEG4 file in which the movie data is stored. On the other hand, it can be said that the file format by the second method (hereinafter referred to as "MPEG4 second format") is suitable when transferring an MPEG4 file for performing a streaming play.

In other words, the MPEG4 first format needs to be adopted as a file format, with which the video camera 101 records the movie data in the recording medium 102, and on the other hand, the MPEG4 second format needs to be adopted as a file format for transferring a movie file to the PC 105 via the wireless transmitting unit 104.

However, one of the purposes of recording the movie file in the recording medium 106 of the PC 105 is to backup a movie file recorded in the recording medium 102 of the video camera 101, and hence the movie files recorded in the recording medium 102 and the recording medium 106 need to be exactly the same data in units of bit. In addition, it depends on the user's operation form which one of the movie file recorded in the recording medium 102 and the movie file recorded in the recording medium 106 takes a role of "backup".

There is no excess or deficiency in the video data and the audio data in both cases, and hence it is also possible to convert the file format from the MPEG4 second format into the MPEG4 first format. However, in the MPEG4 standards (ISO/IEC 14496-12:2008), a sequence of describing parameters in the MOOV BOX is not uniquely determined. In addition, there may be a plurality of ways to describe data of the same meaning, such as a CTTS (Composition Time to Sample: Subclause 8.6.1.3 of ISO/IEC 14496-12:2008) that is one of the pieces of information in the MOOV BOX. Therefore, even when a transferred movie file of the MPEG4 second format is converted into a movie file of the MPEG4 first format, it is not always the case that the same file as the movie file recorded on the video camera side in units of bit is generated.

In the case of the above-mentioned CTTS, when a value of "SAMPLE OFFET=1" is continued 10 times, "SAMPLE OFFET=1/SAMPLE COUNT=1" can be described 10 times, and alternatively, "SAMPLE OFFET=1/SAMPLE COUNT=10" can described only once. Both descriptions have the same meaning. However, the description contents differ from each other, and hence data amounts may differ from each other. Therefore, as described above, it is not always the case that the transmitted movie file is the same as the movie file obtained by converting the transmitted movie file in units of bit.

This means that a request for viewing a video of the movie data transferred from the video camera 101 on a screen of the PC 105 in real time to check the video and a request for setting the movie files recorded in the recording medium 102 and the recording medium 106 to be exactly the same as each other in units of bit cannot be compatible to each other depending on a standard MPEG4 file transfer and a simple file format conversion.

The second problem found by the inventors of the present disclosure relates to a transfer of a metafile associated with the movie file. Depending on the video camera, a movie file is recorded in a built-in recording medium in the MPEG4 file format, and at the same time, associated information on the movie is written in a separate file (hereinafter referred to as "metafile") and recorded in the same recording medium. The reason why such an operation is performed is because there is a need for leaving information that cannot be described in the standard MPEG4 file format together with the movie file. A video camera that performs such an operation includes, in particular, a video camera for professional use.

A specific example of the metafile is described with reference to FIG. 4 and Table 2.

Figure 4:
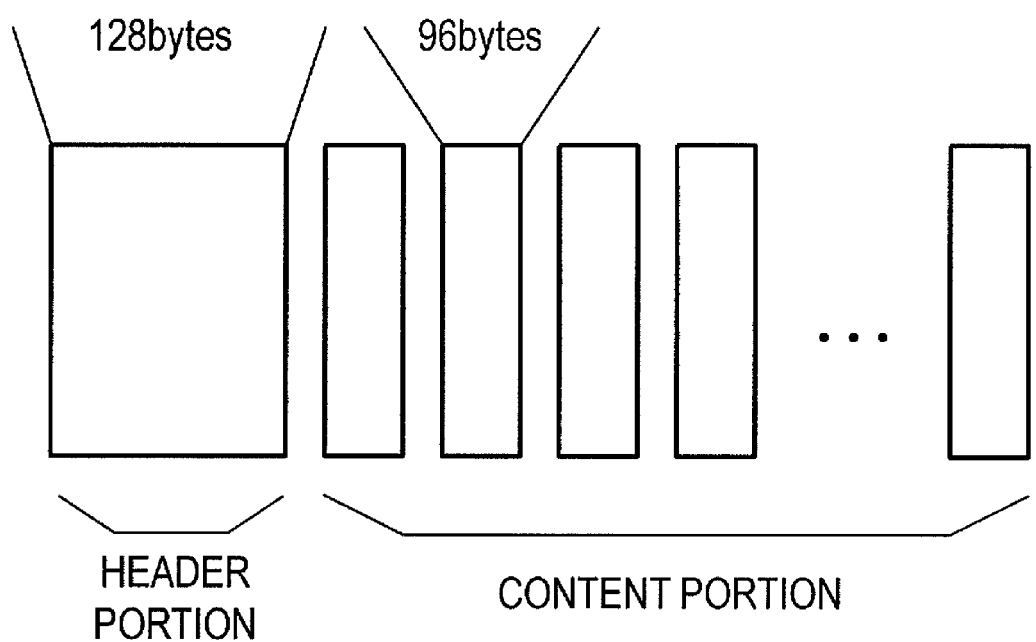
FIG. 4 is a diagram showing a configuration example of a file format of the metafile according to an embodiment.

FIG. 4 illustrates a configuration example of a file format of the metafile. As illustrated in FIG. 4, the metafile includes a header portion and a content portion. A data length of the header portion is 128 bytes. The content portion includes a plurality of blocks each having a data length of 96 bytes. Each block of 96 bytes of the content portion corresponds to one frame of a video included in the movie file, in which associated information on the frame is stored. That is, the first block of 96 bytes indicates the associated information on the first frame of the video included in the movie file, and the next block of 96 bytes indicates the associated information on the second frame of the video included in the movie file.

TABLE 2

| Item | Number of allocated bytes | Meaning |
| --- | --- | --- |
| LTC | 4 bytes | LTC associated with frame |
| LTC UB | 4 bytes | User Bit portion of LTC associated with frame |
| VITC | 4 bytes | VITC associated with frame |
| VITC UB | 4 bytes | User Bit portion of VITC associated with frame |
| UMID | 52 bytes | Unique material identifier (UMID: SMPTE-330M) of video file |
| Reserved | 28 bytes | All set to zero |

Table 2 shows information included in the content portion. The longitudinal time code (LTC) and the vertical interval time code (VITC) in Table 2 are parameters essential for identifying a frame of a video in the professional use. Further, the unique material ID (UMID: SMPTE330M) is only one ID in the world that is assigned to the frame. The UMID can include information on the latitude and the longitude when the frame is recorded.

When the video camera 101 records the above-mentioned metafile in the recording medium 102 together with the movie file, a need for recording the same metafile in the recording medium 106 of the PC 105 occurs naturally and necessarily. That is, how to transfer the metafile from the video camera 101 to the PC 105 becomes a problem. At this time, an attention needs to be paid in transferring a metafile while making it clear which movie file is paired with the metafile.

The inventors of the present disclosure found various problems described above, and created a configuration for solving the problems.

In the following, a recording apparatus according to the exemplary embodiments of the present disclosure is described. As the recording apparatus according to the embodiments, a video camera is described as an example.

[1. Configuration]

In the following, the video camera according to the present disclosure is described with reference to FIG. 5.

Figure 5:
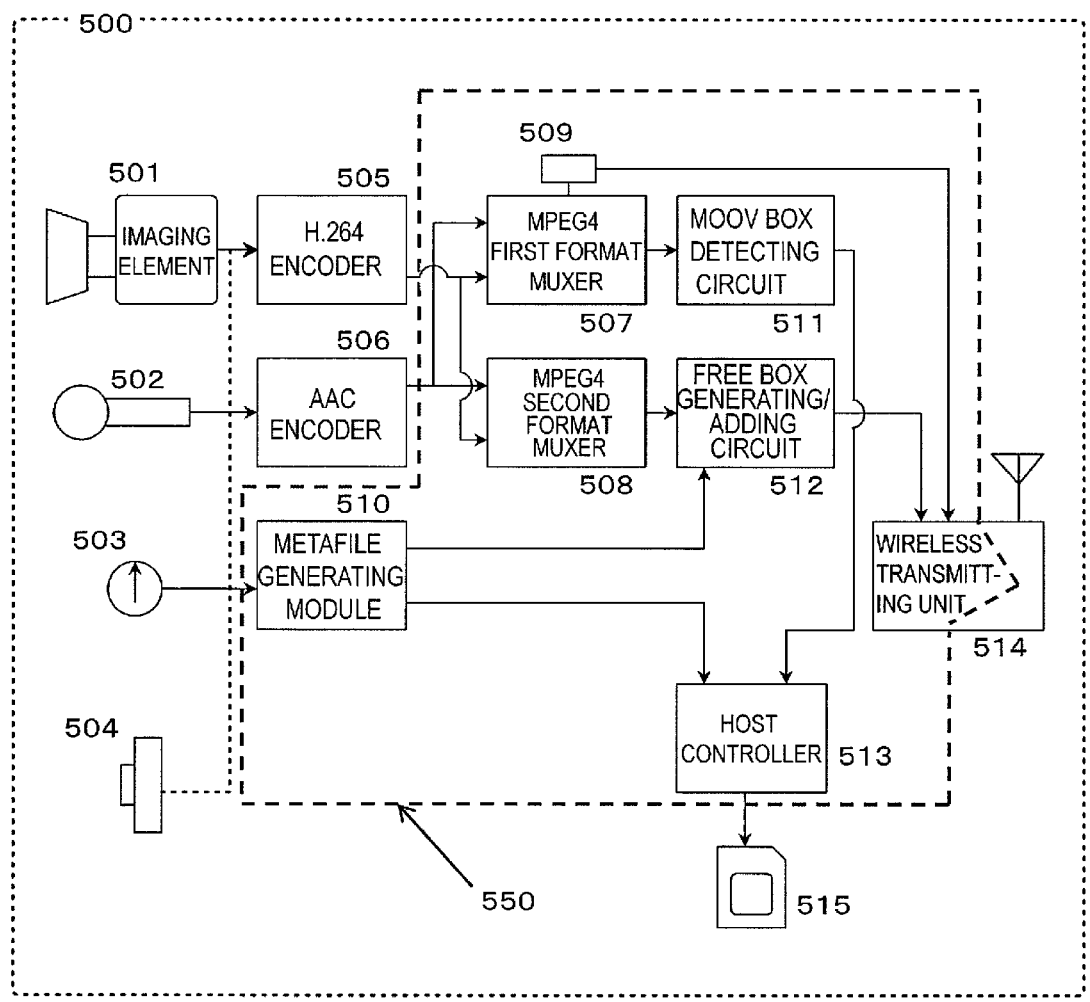
FIG. 5 is a diagram showing a configuration of a video camera according to an embodiment.

FIG. 5 illustrates a configuration of a video camera 500 according to this embodiment.

The video camera 500 includes an imaging element 501, a microphone 502, a sensor 503, a recording start/stop button 504, an H.264 encoder 505, an AAC encoder 506, a wireless transmitting unit 514, and a processor 550.

The imaging element 501 converts an imaging object into an electric signal. The microphone 502 converts an audio into an electrical signal. A signal output from the imaging element 501 is input to the H.264 encoder 505. The user instructs the video camera to start and end a recording via the recording start/stop button 504. Another example of the recording start/stop button 504 can be a recording switch provided on a main body of the video camera.

The H.264 encoder 505 and the AAC encoder 506 are hardware for encoding a video signal and an audio signal, respectively.

The processor 550 is, for example, an operating circuit implemented by an integrated circuit. The processor 550 is, for example, a single central processing unit (CPU). The processor 550 is configured to perform various processes in response to a computer program to be executed. By performing the processes simultaneously or sequentially, the processor 550 functions as if it were a different component. Each function of the processor 550 implemented by such a process is illustrated as a separate circuit or module in FIG. 5. That is, the processor 550 includes an MPEG4 first format muxer 507, an MPEG4 second format muxer 508, a metafile generating module 510, a MOOV BOX detecting circuit 511, a FREE BOX generating/adding circuit 512, a host controller 513, and part of the wireless transmitting unit 514.

As described above, in the present disclosure, there is described an example in which the separate circuit or module is denoted by a reference numeral, and operates as an independent component. As described above, a single processor 550 may be provided to operate as such circuits and modules. Note that, the module may be referred to as a circuit. Further, the circuit and the module may be implemented by hardware, software, or a combination of the hardware and the software.

Although it is described that the processor 550 includes a part of the wireless transmitting unit 514, which is intended that the processor 550 performs up to a process of preparing data to be transmitted. In order to actually transmit the data, a transmitting circuit including a modulating circuit and the like is required other than the processor 550. A configuration of the transmitting circuit is not an essence of the present disclosure, and hence a description thereof is omitted. A generally known transmitting circuit can be used.

The H.264 encoder 505 compresses the input video signal in an H.264 format (ISO/IEC 14496-10). At the same time, a signal output from the microphone 502 is input to the AAC encoder 506. The AAC encoder 506 compresses the input audio signal in an AAC format (ISO/IEC 14496-3).

The video camera 500 according to this embodiment includes two MPEG4 multiplexing circuits (muxers). One of the MPEG4 multiplexing circuits is the MPEG4 first format muxer 507. The MPEG4 first format muxer 507 has a function of storing video data and audio data in a single MPEG4 file format by multiplexing input video data and audio data in a single MDAT BOX and describing all information on the multiplexing in the MOOV BOX. The other is the MPEG4 second format muxer 508. The MPEG4 second format muxer 508 has a function of storing video data and audio data in a single MPEG4 file format by storing input video data and audio data in a plurality of MDAT BOXes in a divided manner and describing information on the multiplexing in each MDAT BOX in the MOOF BOX.

A method of storing the video data and the audio data in the plurality of MDAT BOXes in a divided manner by the MPEG4 second format muxer 508 includes a method of storing the video data and the audio data in a single MDAT BOX every time the video data and the audio data of a predetermined time (for example, 2 seconds) are obtained, a method of storing the video data and the audio data in a single MDAT BOX in units of group of pictures (GOP), and a method of storing the video data and the audio data in a single MDAT BOX every time a total size of the video data and the audio data reaches a predetermined size.

However, in this case, a multiplexing algorithm for multiplexing the video data and the audio data respectively input from the H.264 encoder 505 and the AAC encoder 506 needs to be exactly matched between the MPEG4 first format muxer 507 and the MPEG4 second format muxer 508. That is, both muxers need to be designed so that data obtained by sequentially combining contents of all the MDAT BOXes generated by the MPEG4 second format muxer 508 is exactly the same as contents of the single MDAT BOX generated by the MPEG4 first format muxer 507 in units of bit. That is, focusing only on the output MDAT BOX, the MPEG4 first format muxer 507 and the MPEG4 second format muxer 508 are designed so that the only difference between the MPEG4 first format muxer 507 and the MPEG4 second format muxer 508 is whether to store exactly the same stream data in which the video and the audio are multiplexed in the single MDAT BOX or in the plurality of MDAT BOXes in a sliced manner.

In addition, the MPEG4 first format muxer 507 is connected to a file format switch 509. This is to enable the user to select a file format output from the MPEG4 first format muxer 507 between a format completely complying to the MPEG4 (ISO/IEC 14496-12:2008) defined by the ISO and a Quick-Time Movie format that is a file format similar to the MPEG4. Only a part of the contents described in the FTYP BOX and the MOOV BOX differs between the MPEG4 defined by the ISO and the QuickTime Movie format, and hence the muxer can be easily shared by the two formats. Therefore, the file format switch 509 is connected in the above-mentioned manner.

The compressed data of the video and the audio respectively output from the H.264 encoder 505 and the AAC encoder 506 is input to both the MPEG4 first format muxer 507 and the MPEG4 second format muxer 508.

An output of the MPEG4 first format muxer 507 passes through the MOOV BOX detecting circuit 511 and is input to the host controller 513. The MOOV BOX detecting circuit 511 has a function of detecting that the MPEG4 first format muxer 507 has generated the MOOV BOX and extracting the content of the BOX.

The host controller 513 has a function of recording input data in a recording medium 515 as a file by using a file system suitable for the recording medium 515. With this configuration, the video camera 500 according to this embodiment can record video captured by the imaging element 501 and audio captured by the microphone 502 in the recording medium 515 as a file of the MPEG4 first format.

On the other hand, an output of the MPEG4 second format muxer 508 passes through the FREE BOX generating/adding circuit 512 and is input to the wireless transmitting unit 514. A function of the FREE BOX generating/adding circuit 512 is described later.

The wireless transmitting unit 514 has a function of transferring input data to a receiving apparatus via a wireless LAN. Specifically, a method can be considered in which the input data is transferred to the receiving apparatus as a file by using, for example, a file transfer protocol (FTP: RFC765). A status of the file format switch 509 is also input to the wireless transmitting unit 514. This is to inform the receiving apparatus of the file format recorded in the recording medium 515 by the video camera. Specifically, when transferring the file via the FTP, for example, a method of setting an extension of the file to be transferred to MP4 (in the case of the MPEG4 format) or MOV (in the case of the QuickTime Movie format) can be considered. Although the wireless LAN is used as the network in this embodiment, it is not necessarily to be a wireless scheme, but a wired network can be used without causing any trouble in exerting the effect of the present disclosure. Further, the network itself is not necessarily to be an IP network, but the Bluetooth (trademark) or a simple serial signal transmission such as the USB can also be used.

An output of the sensor 503 is input to the metafile generating module 510. The sensor 503 is an element for acquiring information other than the video and the audio, and a specific example of the sensor 503 includes a clock (including a timecode generator), a global positioning system (GPS), and a circuit for acquiring a status of the video camera (such as a circuit for detecting a type of the recording medium 515 and a target bit rate set in the H.264 encoder 505).

The metafile generating module 510 shapes the input data into a predefined metafile format. Specifically, the metafile generating module 510 stores the input data in the file format described above with reference to FIG. 4. An output of the metafile generating module 510 is input to the host controller 513, and the host controller 513 writes the input information in the recording medium 515 as a file. At this time, a clear pairing with a video file recorded in the same recording medium is performed. For example, the metafile and the video file corresponding to each other are recorded in the recording medium 515 with exactly the same file name except for the extension. With this configuration, it becomes clear which metafile stores information on which video file.

[2. Operation]

Operations of the components of the video camera 500 configured in the above-mentioned manner are described below.

Figure 7:
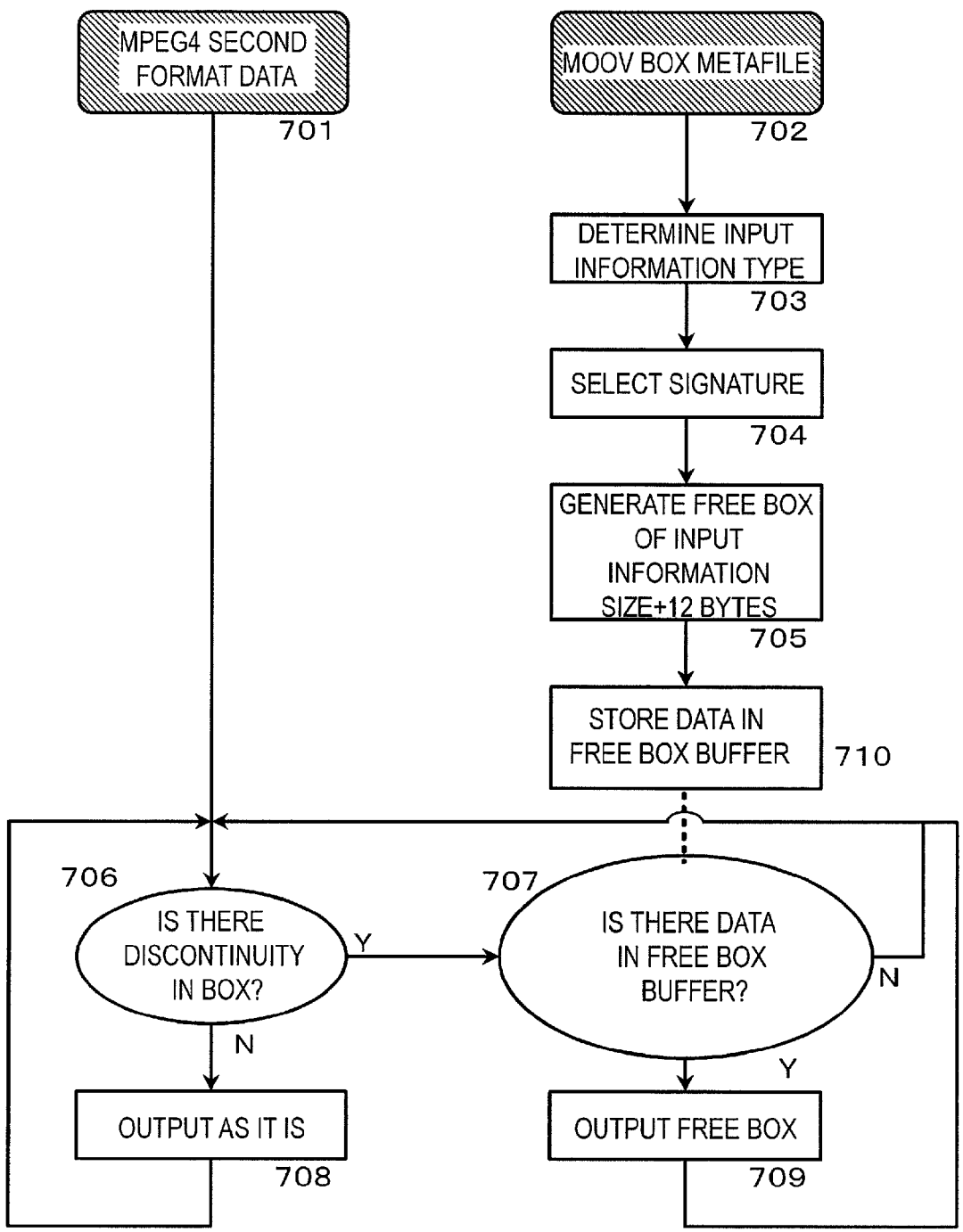
FIG. 7 is a diagram showing a processing procedure performed by the FREE BOX generating/adding circuit according to an embodiment.
Figure 9:
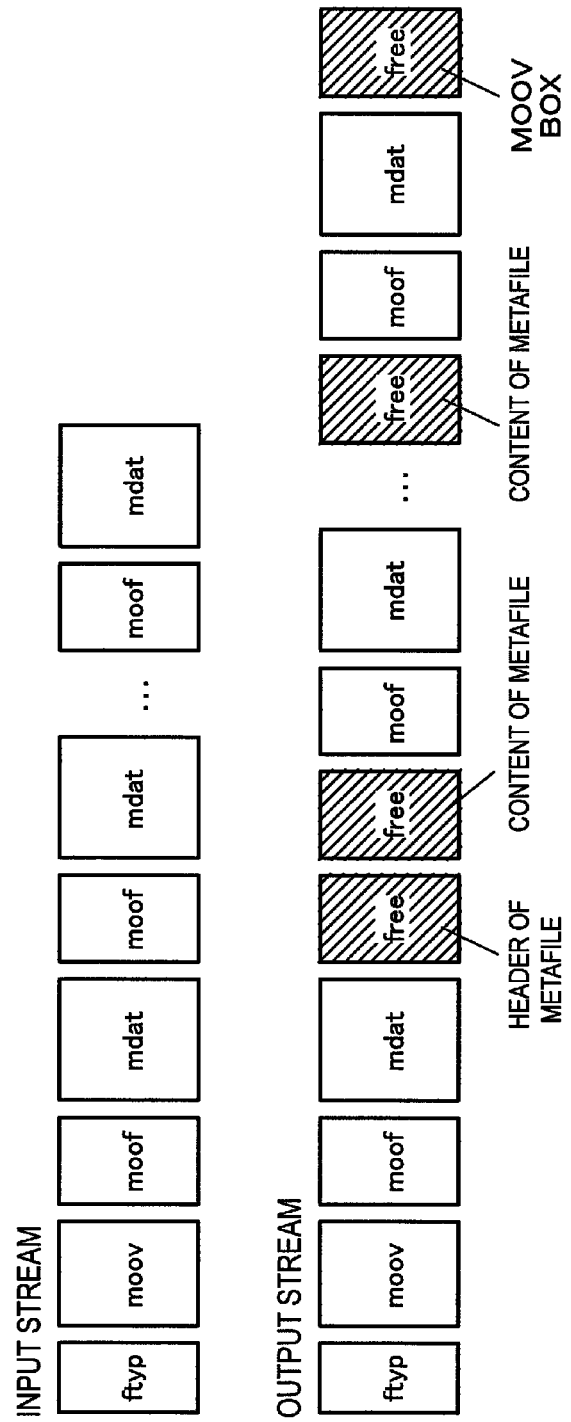
FIG. 9 is a diagram showing a configuration example of the input stream and a configuration example of an output stream according to an embodiment.

In the following, a specific operation of the FREE BOX generating/adding circuit 512 is described with reference to FIGS. 7 and 9. FIG. 7 illustrates a processing procedure performed by the FREE BOX generating/adding circuit 512.

Two types of data are input to the FREE BOX generating/adding circuit 512, the two types of data including an MPEG4 second format stream 701 output from the MPEG4 second format muxer 508 and a MOOV/metafile 702 output from the MOOV BOX detecting circuit 511 and the metafile generating module 510.

When the MOOV/metafile 702 is input, a type of the input data is determined (Step 703). This can be easily determined by checking which module the data is transferred from and content of the data itself. For example, when it is determined from the content of the data itself, if the data is a BOX of the MPEG4 file format, the type of the data can be determined from a character string stored in a range from the fifth byte to the eighth byte from the head of the data. If a character string of "moov" is stored in the range, it can be determined that the type of the data is a MOOV BOX. When the portion is a byte string that does not exist as an MPEG4 BOX name, it can be determined as a metafile.

Subsequently, the FREE BOX generating/adding circuit 512 determines a signature corresponding to the type of the input data. The signature is four ASCII characters indicating the type of the input data. Table 3 shows examples of the signature. For example, the signature is four characters of "moov" when the input data is a MOOV BOX. When the input data is a header portion of a metafile, the signature is four characters of "rmhd", and when the input data is a content portion of a metafile, the signature is four characters of "rmit". In addition, it can be considered that the input data is other than the MOOV BOX and the metafile as described later, and hence a signature unique to each case is defined as shown in Table 3.

TABLE 3

| Signature | Meaning |
|-----------|---------|
| rmhd | Header portion of metafile |
| rmit | Fragment of content portion of metafile |
| moov | MOOV BOX used in MPEG4 first format |
| mlen | Size of mdat box in MPEG4 first format |
| umid | Unique material identifier (UMID: SMPTE-330M) of video file |

Figure 8:
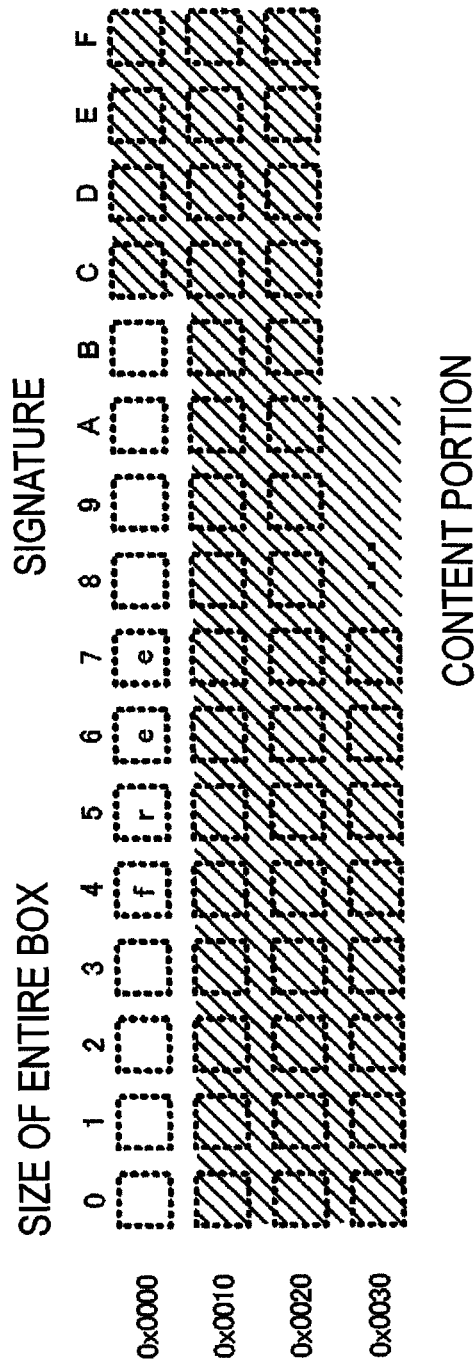
FIG. 8 is a diagram showing a configuration example of the generated FREE BOX according to an embodiment.

Thereafter, the FREE BOX generating/adding circuit 512 generates a single FREE BOX complying with the MPEG4 file format standards (Step 705). A size of this BOX is a size obtained by adding 12 bytes to a size of the input MOOV/ metafile 702. FIG. 8 illustrates a configuration example of the FREE BOX generated in Step 705. In the first four bytes, the size of the entire FREE BOX, i.e., a size obtained by adding 12 bytes to the size of the input MOOV/metafile 702, is written in BIG ENDIAN. The bytes from the fifth byte to the eighth byte are places for describing the type of the BOX, and hence four characters of "free" are described. In the subsequent bytes from the ninth byte to the twelfth byte, the signature selected in Step 704 is described. A size from the thirteenth byte to the end of the BOX is equal to the size of the input MOOV/metafile 702, and hence the input MOOV/metafile 702 is copied in this place as it is. With this configuration, a FREE BOX in which the input MOOV/metafile 702 is stored together with the signature indicating the type of the MOOV/metafile 702 can be generated. The FREE BOX generated in this manner includes information for reproducing the MOOV/metafile (reproduction information).

The generated FREE BOX is temporarily stored in a FREE BOX buffer in Step 710.

On the other hand, the FREE BOX generating/adding circuit 512 interprets a BOX configuration of the input MPEG4 second format stream, and constantly monitors whether or not the input stream includes a boundary of the BOX (Step 706). When there is not discontinuity in the BOX, the input MPEG4 second format stream is output as it is (Step 708). When the input stream includes the boundary of the BOX, it is checked whether or not the FREE BOX generated from the MOOV/metafile described above exists in the FREE BOX buffer in Step 710 (Step 707). When no FREE BOX exists in the FREE BOX buffer, a process of the next input MPEG4 second format stream is continued without performing any further process. When the FREE BOX exists in the FREE BOX buffer 710, the FREE BOX is output at a boundary portion of the BOX.

With the above-mentioned procedure, the FREE BOX generating/adding circuit 512 receives the MPEG4 second format stream. The upper part of FIG. 9 illustrates a configuration example of the input stream. The FREE BOX generating/adding circuit 512 then outputs an MPEG4 file in which the MOOV BOX extracted from the MPEG4 first format file and the FREE BOX that stores the content of the metafile are inserted. The lower part of FIG. 9 illustrates a configuration example of an output stream.

It is to be noted in this procedure that a boundary included between the MOOF BOX and the MDAT BOX needs to be ignored when detecting the boundary of the BOX in Step 706. It is because, when the FREE BOX is inserted between the MOOF BOX and the MDAT BOX, a distance between the MOOF BOX and the MDAT BOX is changed, and hence the information on the separation of the video data and the audio data described in the MOOF BOX becomes useless.

It is to be noted that the MPEG4 file output by the above-mentioned procedure also exactly complies with the MPEG4 second format. The content of the FREE BOX is ignored in a play operation of the video, and hence it does not affect the play of the video. That is, a player apparatus/player software supporting a play of the MPEG4 (ISO/IEC 14496-2008) can play the MPEG4 file illustrated in the lower part of FIG. 9 without having a problem. This enables a real-time viewing portion of the receiving apparatus described below to be generated in a considerably easy manner.

Although the MOOV is the only data extracted from the MPEG4 first format data in this embodiment, the present disclosure is not necessarily to be limited to this. For example, the MPEG4 first format muxer may uniquely extract a FREE BOX or a SKIP BOX to be added and input the extracted BOX to the FREE BOX generating/adding circuit. Both the FREE BOX and the SKIP BOX are BOXes for storing a type of data that is ignored at the time of playing the MPEG4 file. Alternatively, it can be considered to extract a size of the MDAT BOX in the MPEG4 first format, in order to reduce parameters to be calculated by the receiving apparatus as described below. A value of the size of the MDAT BOX can be calculated by obtaining a sum of the sizes of the MDAT BOXes appearing in the MPEG4 second format.

Although the video camera 500 that includes the wireless transmitting unit 514 and transmits the video data is referred to as "video camera" to simplify the description in this embodiment, it is not necessarily to be a so-called "video camera". That is, the data processed by the H.264 encoder 505 and the AAC encoder 506 is not necessarily to be directly input from the imaging element and the microphone, but even if the configuration is such that the video signal and the audio signal are input from an external connection terminal, such configuration causes no problem in exerting the effect of the present disclosure.

Subsequently, a receiving apparatus according to an embodiment of the present disclosure is described with reference to FIG. 6.

Figure 6:
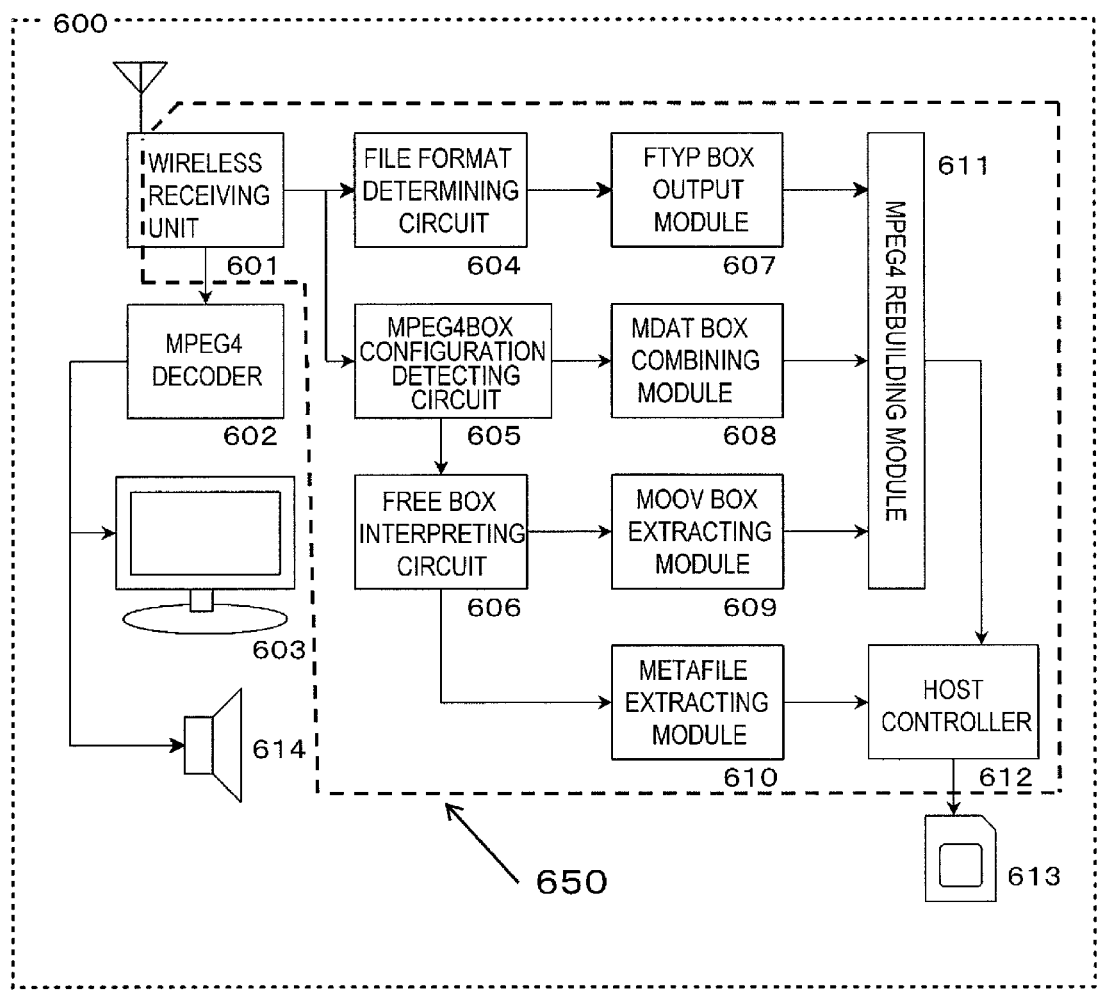
FIG. 6 is a diagram showing a configuration of a receiving apparatus according to an embodiment.

FIG. 6 illustrates a configuration of a receiving apparatus 600 according to this embodiment.

The receiving apparatus 600 includes a wireless receiving unit 601, an MPEG4 decoder 602, a screen 603, a speaker 614, and a processor 650.

The receiving apparatus 600 according to this embodiment decodes video data received from the video camera 500 and presents the decoded video data in real time via the screen 603 and the speaker 614. In parallel to this process, the receiving apparatus 600 records the same file as the MPEG4 first format file recorded in the recording medium 515 of the video camera 500 also in a recording medium 613 of the receiving apparatus 600.

The processor 650 is, for example, an operating circuit implemented by an integrated circuit. The processor 650 is, for example, a single central processing unit (CPU). The processor 650 is also configured to perform various processes in response to a computer program to be executed. By performing the processes simultaneously or sequentially, the processor 650 functions as if it were a different component.

In the same manner as the processor 550 illustrated in FIG. 5, in FIG. 6, each function of the processor 650 is illustrated as a separate circuit or module.

The processor 650 includes a part of the wireless receiving unit 601, a file format determining circuit 604, an MPEG4BOX configuration detecting circuit 605, a FREE BOX interpreting circuit 606, an FTYP BOX output module 607, an MDAT BOX combining module 608, a MOOV BOX extracting module 609, a metafile extracting module 610, an MPEG4 rebuilding module 611, and a host controller 612.

Regarding FIG. 6 as well, the separate circuit or module is denoted by a reference numeral and an example in which the separate circuit or module operates as an independent component is described. As described above, a single processor 650 may be provided to operate as such circuits and modules.

Although it is described that the processor 650 includes a part of the wireless receiving unit 601, this is intended that the processor 650 performs a process of data received and acquired by a receiving circuit including a demodulating circuit. A configuration of the receiving circuit is not an essence of the present disclosure, and hence a description thereof is omitted. A generally known receiving circuit can be used.

The wireless receiving unit 601 receives the MPEG4 second format stream data output from the wireless transmitting unit 514 included in the video camera 500 (see FIG. 5) via the wireless LAN. Specifically, a configuration can be considered in which the receiving apparatus 600 operates as an FTP server so that the MPEG4 second format stream data is received as a file via the wireless receiving unit 601. In the same manner as the video camera 500, the wireless LAN is used as the network in this embodiment. However, the network is not necessarily to be a wireless network, but a wired network can be used without causing any trouble in exerting the effect of the present disclosure. Further, the network itself is not necessarily to be an IP network, but the Bluetooth (trademark) or a simple serial signal transmission such as the USB can also be used.

The data received by the wireless receiving unit 601 is input to the MPEG4 decoder 602. The MPEG4 decoder 602 is hardware or software that extracts the video data encoded by the H.264 and the audio data encoded by the AAC from the MPEG4 second format file format and decodes the extracted video data and audio data so that the video data and the audio data can be, respectively output through the screen 603 and the speaker 614.

The data input to the MPEG4 decoder 602 is the MPEG4 second format file format, and hence the MPEG4 decoder 602 can decode the video and the audio and supply the decoded video and audio to the screen 603 and the speaker 614 without waiting for the reception of all the data. With this configuration, a user of the receiving apparatus can remotely view the video recorded by the video camera described with reference to FIG. 5 in real time.

As described above, the MPEG4 second format stream transmitted from the video camera 500 completely complies to the MPEG4 standards (ISO/IEC 14496-2008), and hence the MPEG4 decoder 602 can use a general MPEG4 decoder, rather than a part specialized for this embodiment. This enables the receiving apparatus to be manufactured at low cost in a simple manner.

On the other hand, the wireless receiving unit 601 also inputs the received MPEG4 second format stream to the file format determining circuit 604 and the MPEG4BOX configuration detecting circuit 605. The file format determining circuit 604 detects a file format recorded by the video camera 500 in the recording medium 515. Specifically, an algorithm can be considered in which the file format determining circuit 604 checks whether an extension of the file received by the wireless receiving unit 601 is MOV or MP4. When the extension is the MOV, the file format determining circuit 604 determines that the file format is the MPEG4 format, and when the extension is MP4, the file format determining circuit 604 determines that the file format is the QuickTime Movie format. A determination result of the file format determining circuit 604 is notified to the FTYP BOX output module 607, and the FTYP BOX output module 607 inputs an FTYP BOX corresponding to the notified result to the MPEG4 rebuilding module 611.

The MPEG4BOX configuration detecting circuit 605 has a function of interpreting a BOX configuration of the input MPEG4 second format stream and switching modules for processing content of the MPEG4 second format stream depending on a type of the BOX. An MDAT BOX included in the input MPEG4 second format stream is supplied to the MDAT BOX combining module 608. The MDAT BOX combining module 608 has a function of extracting contents of a plurality of input MDATs and storing the extracted contents in a single MDAT. Specifically, the MDAT BOX combining module 608 sequentially connects the contents of the input MDAT BOX from which leading 8 bytes (corresponding to the description of the BOX size and the BOX type) are removed, and adds a value obtained by adding 8 to a total size of the connected data and a character string of "mdat" to the head of the data as the description of the BOX size and the BOX type. The single MDAT BOX generated in this manner is input to the MPEG4 rebuilding module 611.

As described above, focusing only on the output MDAT BOX, the MPEG4 first format muxer and the MPEG4 second format muxer included in the video camera 500 have the only difference whether to store exactly the same stream data in a single MDAT BOX or in a plurality of MDAT BOXes in a sliced manner. Therefore, The MDAT BOX output from the MDAT BOX combining module 608 completely matches the MDAT BOX included in the MPEG4 first format data recorded in the recording medium 515 of the video camera 500.

Further, the MPEG4BOX configuration detecting circuit 605 supplies the FREE BOX included in the input stream to the FREE BOX interpreting circuit 606. The FREE BOX interpreting circuit 606 determines a type of data stored in content of the input FREE BOX. Specifically, the FREE BOX interpreting circuit 606 determines the type of the stored data by collating leading 4 bytes of the content of the FREE BOX with Table 3.

When it is determined that the stored data is the MOOV BOX of the MPEG4 first format stored by the function of the MOOV BOX detecting circuit 511 and the FREE BOX generating/adding circuit 512 included in the video camera 500, the FREE BOX interpreting circuit 606 supplies the FREE BOX to the MOOV BOX extracting module 609. The MOOV BOX extracting module 609 extracts the MOOV BOX by removing leading 12 bytes (corresponding to the description of the FREE BOX size, the character string of "free", and the signature described in Table 3) of the FREE BOX, and outputs the extracted MOOV BOX to the MPEG4 rebuilding module 611. Further, when it is determined that the stored data is data pertaining to the metafile, the FREE BOX interpreting circuit 606 inputs the content to the metafile extracting module 610.

On the other hand, the MPEG4BOX configuration detecting circuit 605 discards the MOOF BOX included in the input stream. The reason is that the information stored in the MOOF BOX when generating the MPEG4 first format file is not necessary, because the information on separation of the video data and the audio data is described in the MOOV BOX included in the FREE BOX.

The MPEG4 rebuilding module 611 has a function of generating a single MPEG4 first format stream by combining outputs of the FTYP BOX output module 607, the MDAT BOX combining module 608, and the MOOV BOX extracting module 609. Specifically, the MPEG4 rebuilding module 611 combines the outputs of the modules by arranging the outputs in the order illustrated in FIG. 2. The generated MPEG4 first format stream is supplied to the host controller 612, and the host controller 612 records the input data in the recording medium 613 as a file.

The metafile extracting module 610 generates a metafile from the input FREE BOX. Specifically, when the data stored in the FREE BOX is a content portion of the metafile, the metafile extracting module 610 sequentially combines the data, and when the data stored in the FREE BOX is a header portion of the metafile, the metafile extracting module 610 adds the data to a head of the content portion of the metafile combined in the above-mentioned manner. With this configuration, the same data as the metafile recorded in the recording medium 515 of the video camera 500 can be generated. The generated data is supplied to the host controller 612, and the host controller 612 records the input data in the recording medium 613 as a file. At this time, the host controller 612 performs a clear pairing of the video file and the metafile corresponding to each other. For example, the video file and the metafile corresponding to each other are recorded in the recording medium 613 with exactly the same name except for the extension. With this configuration, it becomes clear which metafile stores information on which video file.

With the operations of the video camera 500 and the receiving apparatus 600 described above, a user of the receiving apparatus 600 can record exactly the same data as the video file recorded in the recording medium 515 of the video camera 500 in units of bit in the recording medium 613 of the receiving apparatus 600 while viewing the video taken by the video camera 500 in real time.

Although only an example in which the FREE BOX interpreting circuit 606 included in the receiving apparatus 600 detects storing of the MOOV BOX and the metafile is described in this embodiment, when the video camera 500 stores other data in the FREE BOX as described above, a configuration can be adopted in which the other information is extracted and output to the MPEG4 rebuilding module 611.

Although the FREE BOX is used as a BOX for the video camera 500 to store the information pertaining to the MPEG4 first format in this embodiment, the BOX used may be the SKIP BOX that has the same function in the MPEG4 standards. The same function means that the BOXes have the same function in that those are the BOXes for storing types of data that are ignored at the time of playing the movie file. In this case, the BOX from which the receiving apparatus 600 extracts the information pertaining to the MPEG4 first format is also the SKIP BOX.

In the following, with reference to FIGS. 10 and 11, configuration examples of a video camera 1000 and a receiving apparatus 1100 for practically implementing the present disclosure are described.

Figure 10:
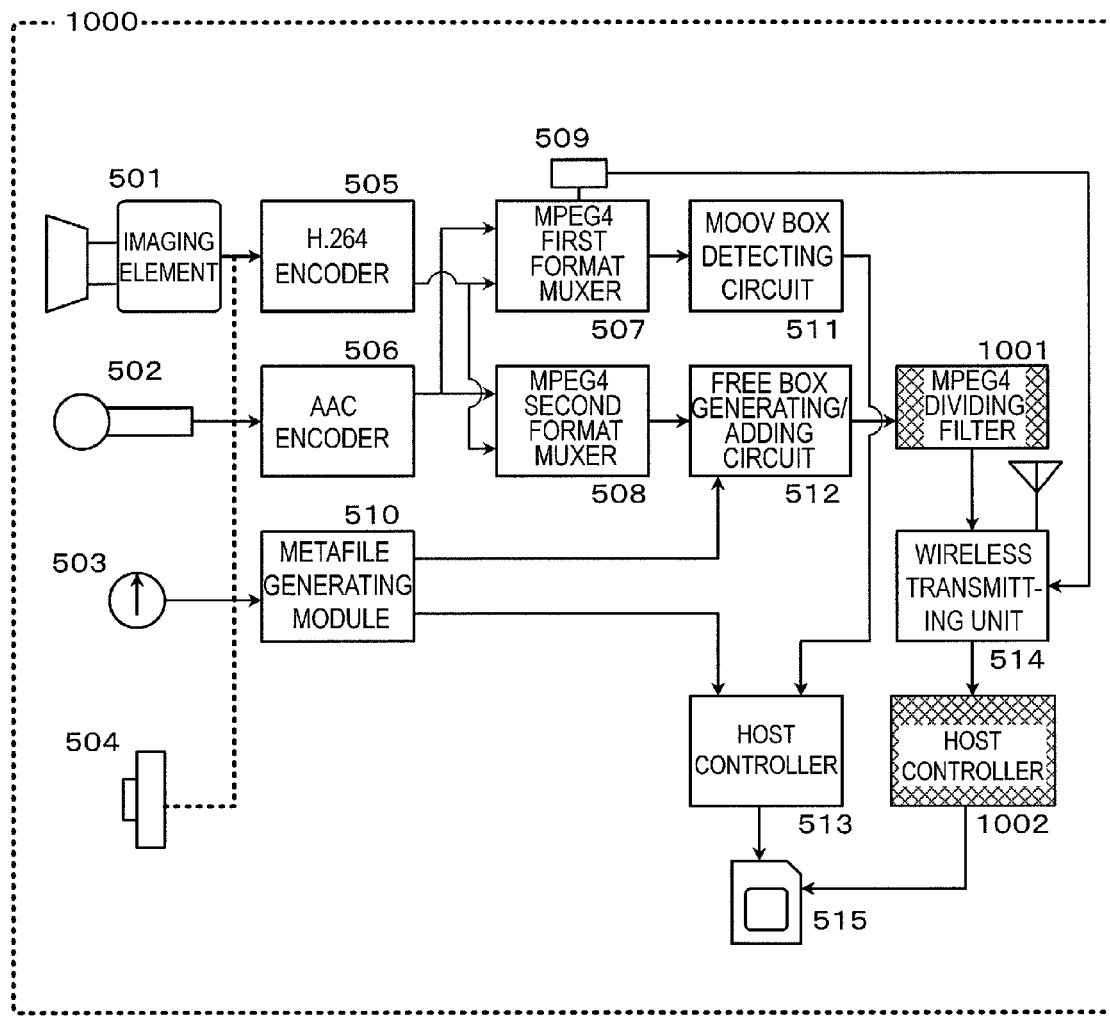
FIG. 10 is a diagram showing a configuration example of the video camera according to an embodiment.

FIG. 10 illustrates a configuration example of the video camera 1000. A block having the same function as that illustrated in FIG. 5 is assigned with the same reference numeral, and a description thereof is omitted. FIG. 11 illustrates a configuration example of the receiving apparatus 1100 that receives movie data transmitted from the video camera 1000. A block having the same function as that illustrated in FIG. 6 is assigned with the same reference numeral, and a description thereof is omitted.

Figure 11:
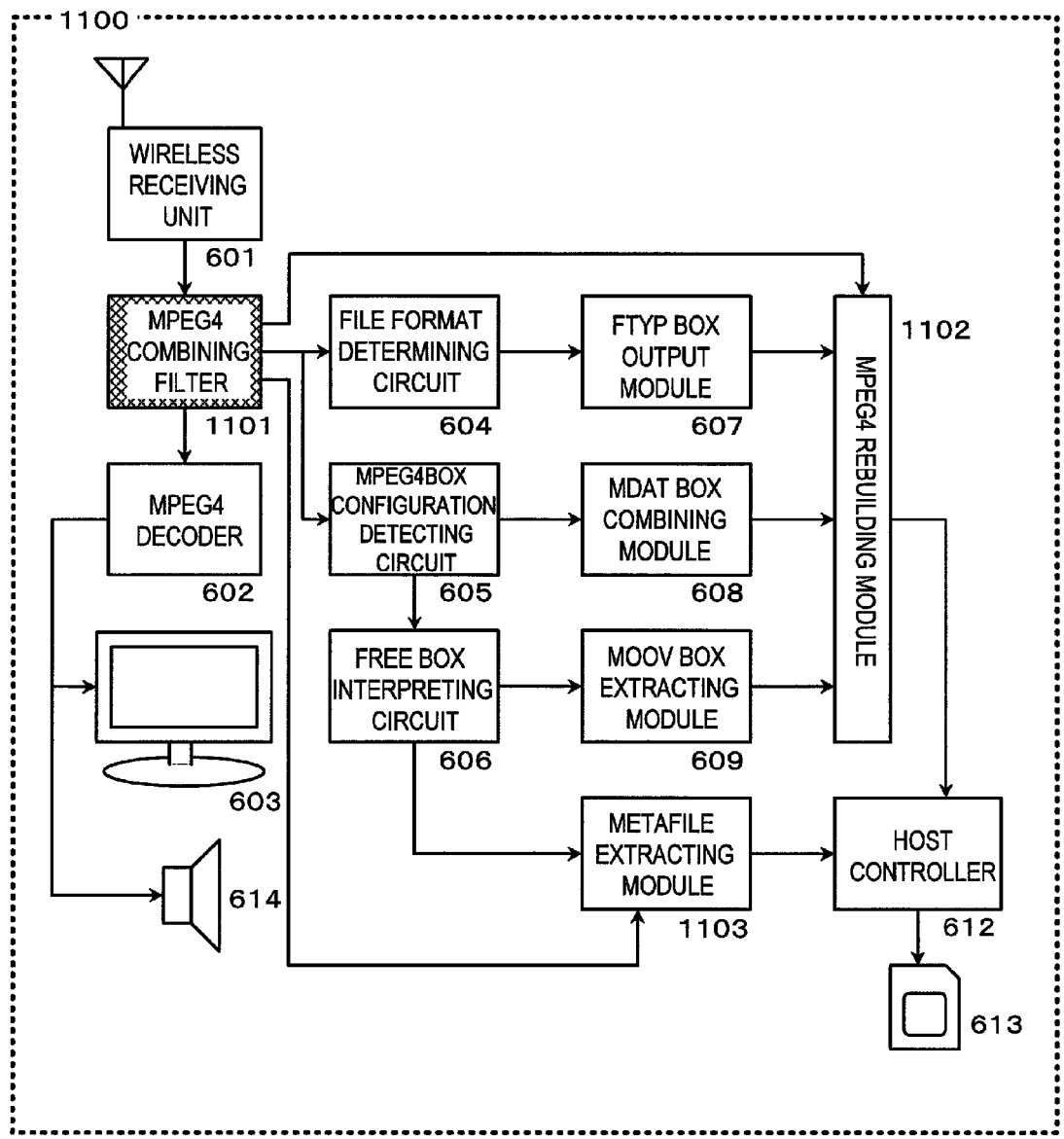
FIG. 11 is a diagram showing a configuration example of the receiving apparatus that receives movie data transmitted from the video camera according to an embodiment.

In FIGS. 10 and 11, an illustration corresponding to the CPU is omitted. However, in FIG. 10, it suffices that an MPEG4 dividing filter 1001 and a host controller 1002 are further implemented by the CPU. Likewise, in FIG. 11, it suffices that an MPEG4 combining filter 1101 is further implemented by the CPU.

A difference between the video camera 500 illustrated in FIG. 5 and the video camera 1000 illustrated in FIG. 10 is that the MPEG4 dividing filter 1001 is provided after the FREE BOX generating/adding circuit 512.

Further, a difference between the receiving apparatus 600 illustrated in FIG. 6 and the receiving apparatus 1100 illustrated in FIG. 11 is that the MPEG4 combining filter 1101 is provided after the wireless receiving unit 601 and an MPEG4 rebuilding module 1102 and a metafile extracting module 1103 are configured to instruct the wireless receiving unit 601 to read data. These differences are each intended to cope with a problem which arises when a communication between the wireless transmitting unit 514 of the video camera 500 and the wireless receiving unit 601 of the receiving apparatus 600 is temporarily interrupted by a communication failure. That is, with these new components, a real-time viewing can be promptly restored at the receiving apparatus after recovering from the failure and the video data recorded in the recording medium 613 of the receiving apparatus can be recovered.

In this example, a method of storing the video data and the audio data in a single MDAT BOX in units of group of pictures (GOP) is used as a method of storing the video data and the audio data in the plurality of MDAT BOXes in a divided manner by the MPEG4 second format muxer 508. This is to enable the video and the audio to be independently played when the MDAT BOX and the corresponding MOOF BOX are extracted.

Figure 12:
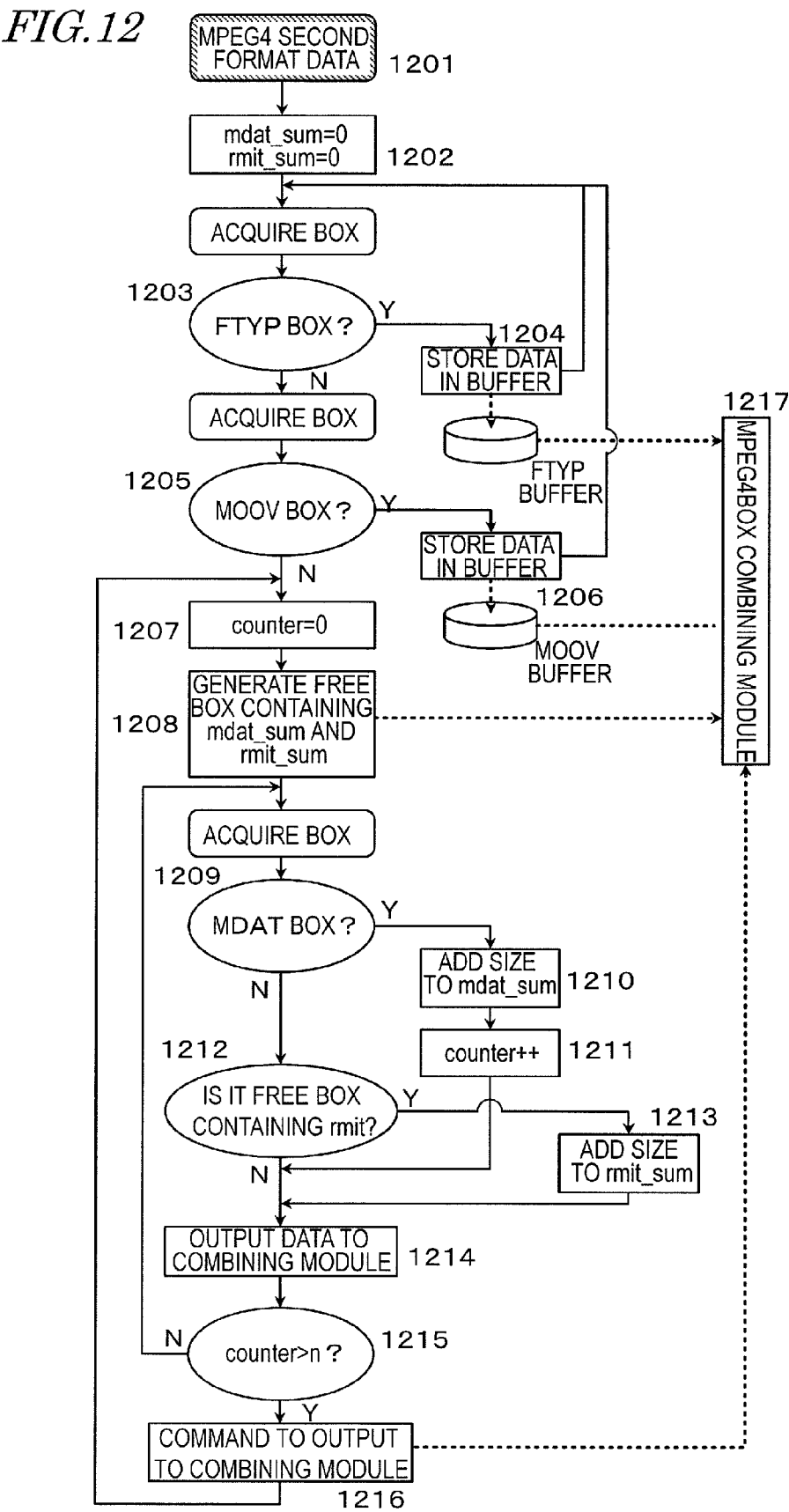
FIG. 12 is a diagram showing a function of the MPEG4 dividing filter included in the video camera according to an embodiment.

Subsequently, with reference to FIG. 12, a function of the MPEG4 dividing filter 1001 included in the video camera 1000 is described.

An MPEG4 second format stream 1201 output from the FREE BOX generating/adding circuit 512 is input to the MPEG4 dividing filter 1001. The MPEG4 dividing filter 1001 is a filter for dividing the MPEG4 stream into a plurality of streams while sequentially interpreting the BOX configuration included in the stream and causing each divided stream to be a stream complying with the MPEG4 standards that can be independently played.

Firstly, the MPEG4 dividing filter 1001 initializes values of a variable MDAT_SUM and a variable RMIT_SUM to zero (Step 1202). These variables are used to record a sum of the sizes of the MDAT BOXes transmitted from the video camera 1000 to the receiving apparatus 1100 and a sum of the sizes of the FREE BOXes storing the metafile.

Subsequently, a configuration of the input stream is interpreted to find the FTYP BOX from the input stream (Step 1203). This always appears at a leading portion of the input stream 1201. The found FTYP BOX is stored in the FTYP BOX buffer (Step 1204).

Thereafter, the configuration of the input stream is interpreted to find the MOOV BOX from the input stream (Step 1205). This appears immediately after the FTYP BOX if the stream is a normal MPEG4 second format stream. The found MOOV BOX is stored in the MOOV BOX buffer (Step 1206).

Subsequently, a value of a variable COUNTER is initialized to zero (Step 1207). This variable is used to control the number of MDAT BOXes included in the MPEG4 stream after the division.

Figure 13:
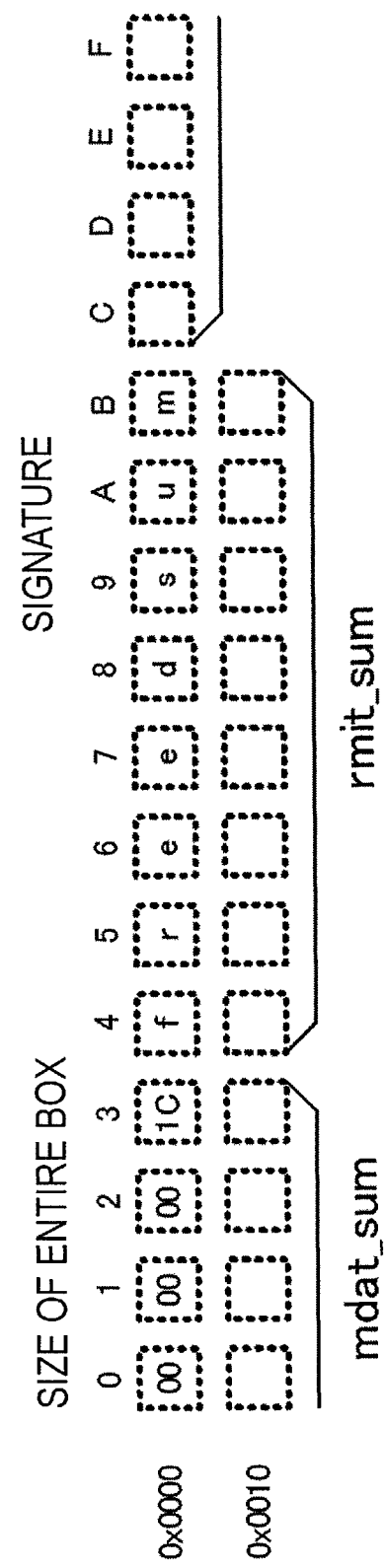
FIG. 13 is a diagram showing a configuration example of the generated FREE BOX according to an embodiment.

Thereafter, by using the values of the variable MDAT_SUM and the variable RMIT_SUM described above, the FREE BOX is generated (Step 1208). FIG. 13 illustrates a configuration example of the generated FREE BOX. In the FREE BOX illustrated in FIG. 13, the value of the MDAT_SUM (8 bytes) is stored after the twelfth byte in BIG ENDIAN, and the value of the RMIT_SUM (8 bytes) is stored after twentieth byte in BIG ENDIAN. Further, four characters of "dsum" are described in an area of 4 bytes from the eighth byte, which precedes the above-mentioned values. This is a signature for indicating that the data stored in the FREE BOX is the values of the variable MDAT_SUM and the variable RMIT_SUM, having the same function as the signature described with reference to Table 3.

Subsequently, the next BOX is received from the input stream 1201, and it is determined whether or not the received BOX is an MDAT BOX (Step 1209). When the received BOX is an MDAT BOX, the value of the MDAT_SUM is incremented by "size of the entire MDAT BOX-8 bytes" (Step 1210). Here, "−8 bytes" is a subtraction for calculating a net data size by removing the leading 8 bytes of the MDAT BOX (descriptions of the size and the type of the BOX). Further, the variable COUNTER is incremented by 1 (Step 1211).

When the received BOX is not an MDAT BOX, it is determined whether or not the received BOX is a FREE BOX in which the content of the metafile is stored (Step 1212). For example, if the signature described with reference to Table 3 is used, it suffices to check whether or not the four characters of "rmit" are stored after 8 bytes from the head of the FREE BOX. When the received BOX is a FREE BOX in which the content of the metafile is stored, the value of the variable RMIT_SUM is incremented by "size of the entire FREE BOX-12 bytes" (Step 1213). Here, "−12 bytes" is a subtraction for calculating a net data size by removing the leading 12 bytes of the FREE BOX (signature describing the size and the type of the BOX).

Thereafter, the received BOX is supplied to an MPEG4BOX combining module 1217 (Step 1214). A function of the MPEG4BOX combining module 1217 is described later.

Subsequently, it is determined whether or not the value of the variable COUNTER is smaller than a predetermined constant n (Step 1215). The constant n is an integer equal to or larger than 1, and is the maximum number of MDAT BOXes included in the MPEG4 stream after the division. This value is determined based on a speed of recovering the real-time viewing on the receiving apparatus 1100 side when a communication failure between the video camera 1000 and the receiving apparatus 1100 is recovered, and if the viewing is to be recovered immediately after the recovery of the communication, a small value is selected, and if it is allowed to take time between the recovery of the communication and the recovery of the viewing, a large value is selected. When a large value is selected, the total size of data communicated between the video camera 1000 and the receiving apparatus 1100 is decreased (because the number of FTYP BOXes and MOOV BOXes transmitted at the discontinuity of the stream is decreased), which enables a load on a transmission channel to be reduced.

When it is determined that the value of the variable COUNTER is smaller than the constant n from the determination of Step 1215, the process control returns to Step 1209 to wait for an input of the next BOX. When it is determined that the value of the variable COUNTER is equal to or larger than the constant n, an output command is transmitted to the MPEG4BOX combining module 1217, and after that, the process control returns to before Step 1207 to wait for an input of the next BOX (Step 1216).

Upon receiving the output command, the MPEG4BOX combining module 1217 sequentially combines (1) FTYP BOX buffer, (2) MOOV BOX buffer, (3) the latest FREE BOX supplied from Step 1208, and (4) all BOXes supplied from Step 1214 after the last received output command, and inputs the combined data to the wireless transmitting unit 514.

Figure 14:
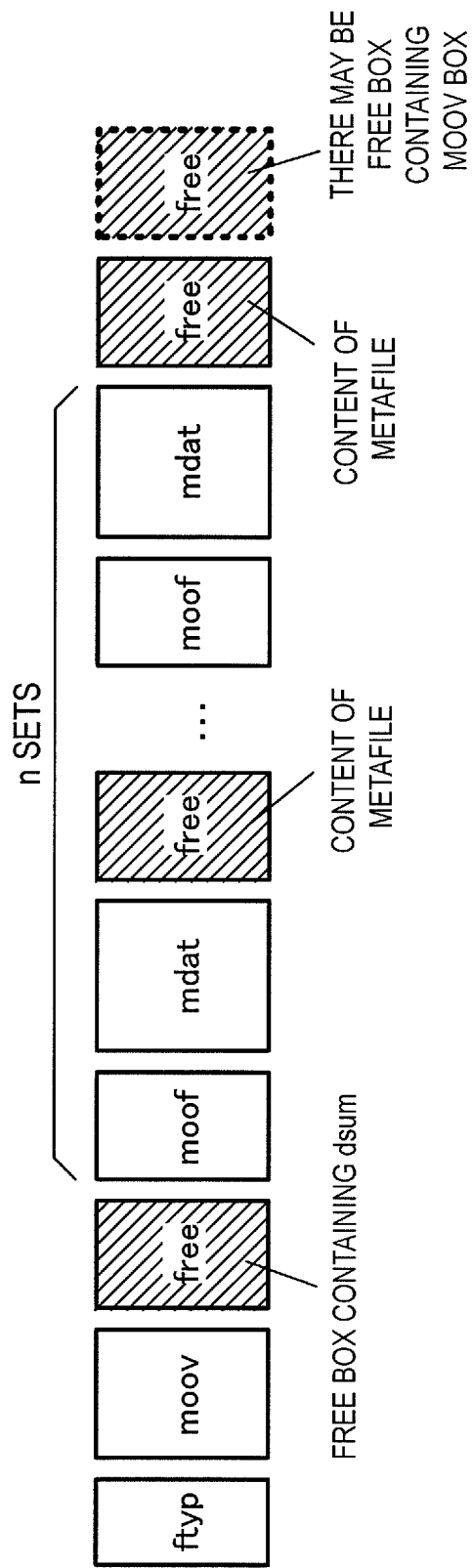
FIG. 14 is a diagram showing an example of the fragment streams according to an embodiment.

With the above-mentioned processes, the MPEG4 second format stream (the lower part of FIG. 9) input from the FREE BOX generating/adding circuit 512 is divided into a plurality of small MPEG4 second format streams (hereinafter referred to as "fragment streams") by the MPEG4 dividing filter 1001. FIG. 14 illustrates an example of the fragment streams. Because the fragment streams comply with the MPEG4 standards, a player, which can play an MPEG4 file, can play video and audio with a single fragment stream.

The wireless transmitting unit 514 transmits each fragment stream to the receiving apparatus 1100 as a separate file. For example, a method of sequentially transferring the fragment streams by the FTP as files having different names from each other can be considered. FIG. 18 illustrates an example of a naming rule for a file name when sequentially transferring the fragment streams by the FTP as files having different names from each other. The file name illustrated in FIG. 18 includes a total of six portions including five portions divided by "_" and an extension. A model of the video camera is described in the first section, and a serial number of the video camera is described in the second section. With this configuration, a video camera that transmits the video can be identified. The third section includes two numbers. The first number indicates the status of the video camera, where "1" indicates a status in which the video camera is recording a movie and "0" indicates a status in which the video camera is stopped. By checking these numbers, the receiving apparatus 1100 can determine whether or not the receiving apparatus 1100 needs to record the video file and the metafile. The second number is an end flag of the stream. When the MPEG4 second format stream output from the FREE BOX generating/adding circuit 512 encounters an end due to stopping of the recording operation or the like, a value of this flag is set to 1 in a file name added to a fragment stream corresponding to the end of the stream. Otherwise, the value of this flag is set to 0. With this configuration, the receiving apparatus 1100 can easily determine the end of the stream. The fourth section indicates a unique number added to each MPEG4 second format stream output from the FREE BOX generating/adding circuit 512. For simple example, an integer value that is incremented by 1 every time the MPEG4 second format stream output from the FREE BOX generating/adding circuit 512 is switched due to stopping of the recording operation or the like can be considered. By entering this value in the file name, even when a transfer of a file in which the "end flag of the stream" is set to 1 as described above is missing due to a communication failure or the like, the receiving apparatus 1100 can recognize that the stream is switched based on a change of this value. In the fifth section, a sum of the sizes of the transmitted fragment streams is described. This value is reset to zero every time the MPEG4 second format stream output from the FREE BOX generating/adding circuit 512 is switched due to stopping of the recording operation or the like. The receiving apparatus 1100 can easily check whether or not there is a missing of data transfer due to a communication failure or the like, by comparing this value with the total size of fragment files received by the receiving apparatus 1100. The last extension portion reflects the status of the file format switch 509 as described above, which is a character string of "MOV" or "MP4".

Figure 15:
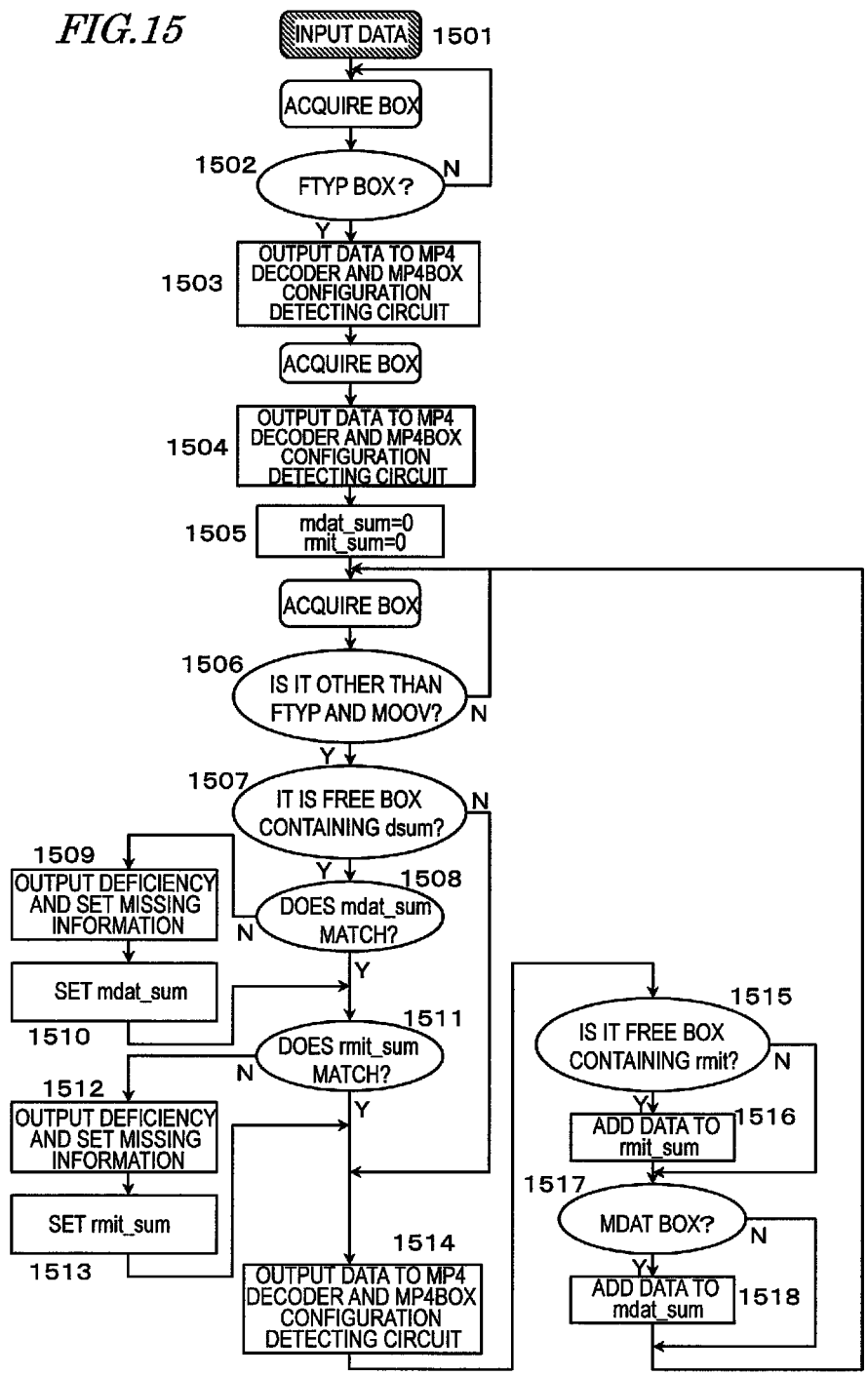
FIG. 15 is a flowchart showing an operation of the MPEG4 combining filter according to an embodiment.

With reference to FIG. 15, a function of the MPEG4 combining filter 1101 included in the receiving apparatus 1100 according to this example is described.

FIG. 15 is a flowchart illustrating an operation of the MPEG4 combining filter 1101.

The MPEG4 combining filter 1101 uses an output of the wireless receiving unit 601 as input data 1501, interprets a BOX in the MPEG4 file format based the input data 1501, and acquires content of the BOX.

The MPEG4 combining filter 1101 determines whether or not the acquired BOX is an FTYP BOX (Step 1502). When the received BOX is not an FTYP BOX, the next BOX is interpreted and acquired. When the received BOX is an FTYP BOX, the BOX is supplied to the MPEG4 decoder 602 and the MPEG4BOX configuration detecting circuit 605 (Step 1503). Steps 1502 and 1503 are processes for supplying an MPEG4 second format stream of the correct format starting from the FTYP BOX to the MPEG4 decoder 602 and the MPEG4BOX configuration detecting circuit 605 even when the receiving apparatus 1100 receives the video data transmitted from the video camera 1000 from the middle of the stream.

Subsequently, the MPEG4 combining filter 1101 interprets and acquires the next BOX based on the input data 1501. Because this BOX is a BOX next to the FTYP BOX, it is always a MOOV BOX in this example. The MPEG4 combining filter 1101 supplies this BOX to the MPEG4 decoder 602 and the MPEG4BOX configuration detecting circuit 605 (Step 1504).

Thereafter, both values of a variable CAPTURED_MDAT_ SUM and a variable CAPTURED_RMIT_SUM are initialized to zero (Step 1505). These variables are used to detect a missing of data due to a communication failure or the like.

Subsequently, the MPEG4 combining filter 1101 interprets and acquires the next BOX based on the input data 1501. The MPEG4 combining filter 1101 then determines whether or not the acquired BOX is other than "an FTYP BOX or a MOOV BOX" (Step 1506). When the acquired BOX is "an FTYP BOX or a MOOV BOX", the next BOX is interpreted and acquired again based on the input data 1501. On the other hand, when the acquired BOX is other than "an FTYP BOX or a MOOV BOX", it is determined whether or not the BOX is a FREE BOX having "dsum" in the signature, i.e., the FREE BOX generated in Step 1208 in FIG. 12 (Step 1507).

When it is determined in Step 1507 that the BOX is a FREE BOX having "dsum" in the signature, the following processes are performed. Firstly, a comparison whether or not a value of the MDAT_SUM (see FIG. 13 described above) recorded in the FREE BOX matches that of the variable CAPTURED_MDAT_SUM is performed (Step 1508). When these values do not match each other, it means that there is a missing in the data received by the receiving apparatus 1100. In this case, the MPEG4 combining filter 1101 notifies the value of the MDAT_SUM recorded in the FREE BOX and the value of the variable CAPTURED_MDAT_SUM to the MPEG4 rebuilding module 1102, generates an MDAT BOX having the number of bytes of a value corresponding to a difference between the value of the MDAT_SUM recorded in the FREE BOX and the value of the variable CAPTURED_MDAT_SUM as its content, and supplies the generated MDAT BOX to the MPEG4BOX configuration detecting circuit 605 (Step 1509). At this time, content of the data stored in the content of the MDAT BOX does not matter. For example, a value of all zero can be filled in. After that, the value of the MDAT_SUM recorded in the FREE BOX is substituted to the variable CAPTURED_MDAT_SUM (Step 1510). An operation of the MPEG4 rebuilding module 1102 that is notified of the value of the MDAT_SUM recorded in the FREE BOX and the value of the variable CAPTURED_MDAT_SUM is described later.

Thereafter, the MPEG4 combining filter 1101 performs a comparison whether or not a value of the RMIT_SUM (see FIG. 13 described above) recorded in the FREE BOX matches that of the variable CAPTURED_RMIT_SUM (Step 1511). When these values do not match each other, the MPEG4 combining filter 1101 notifies the value of the RMIT_ SUM recorded in the FREE BOX and the value of the variable CAPTURED_RMIT_SUM to the metafile extracting module 1103, generates a FREE BOX having "rmit" as the signature and the number of bytes of a value corresponding to a difference between the value of the RMIT_SUM recorded in the FREE BOX and the value of the variable CAPTURED_RMIT_SUM as its content, and supplies the generated FREE BOX to the MPEG4BOX configuration detecting circuit 605 (Step 1512). At this time, content of the data stored in the content of the FREE BOX does not matter. For example, a value of all zero can be filled in. After that, the value of the RMIT_SUM recorded in the FREE BOX is substituted to the variable CAPTURED_RMIT_SUM (Step 1513). An operation of the metafile extracting module 1103 that is notified of the value of the RMIT_SUM recorded in the FREE BOX and the value of the variable CAPTURED_RMIT_SUM is described later.

After the above-mentioned processes are completed, the MPEG4 combining filter 1101 outputs the BOX to the MPEG4BOX configuration detecting circuit 605 and the MPEG4 decoder 602 (Step 1514).

Subsequently, it is determined whether or not the BOX is a FREE BOX including a signature of "rmit" (Step 1515), and when the BOX is a FREE BOX including a signature of "rmit", a value obtained by subtracting 12 bytes from a size of the FREE BOX is added to the variable CAPTURED_RMIT_ SUM (Step 1516). The subtraction of 12 bytes is performed to calculate only a size of a portion in which the content portion of the metafile is stored, by subtracting a size of a portion corresponding to the size description of the FREE BOX itself, four characters of "free", and the signature.

Thereafter, it is determined whether or not the BOX is an MDAT BOX (Step 1517), and when the BOX is an MDAT BOX, a value obtained by subtracting 8 bytes from a size of the MDAT BOX is added to the variable CAPTURED_MDAT_SUM (Step 1518). The subtraction of 8 bytes is performed to calculate only a size of the content of the MDAT BOX, by subtracting a size of a portion corresponding to the size description of the MDAT BOX itself and four characters of "mdat".

When the above-mentioned processes are completed, the next BOX is interpreted and acquired again, and the processes after Step 1506 are repeated. With this operation, exactly the same stream as the MPEG4 second format stream output from the FREE BOX generating/adding circuit 512 included in the video camera 1000 is output from the MPEG4 combining filter 1101 to the MPEG4BOX configuration detecting circuit 605 except for a missing portion due to a communication failure or the like. Further, information on the missing portion becomes also notified to the MPEG4 rebuilding module 1102 and the metafile extracting module 1103 without omission. At the same time, an MPEG4 second format stream from which the missing portion due to a communication failure or the like is removed is output to the MPEG4 decoder 602. With this configuration, even when the communication is interrupted between the video camera 1000 and the receiving apparatus 1100 due to a communication failure or the like, a user of the receiving apparatus 1100 can promptly view the video taken by the video camera 1000 in real time after recovering the communication. The same applies to a case where the receiving apparatus 1100 starts a reception of the video after an elapse of time since the video camera 1000 starts a transmission of the video.

A method of building an MPEG4 first format stream based on outputs of the FTYP BOX output module 607 and the MDAT BOX combining module 608 by the MPEG4 rebuilding module 1102 is the same as that of the embodiment described above. However, in this example, a difference from the above-mentioned embodiment is that this example has a function of compensating for the missing data based on the information on the missing notified from the MPEG4 combining filter 1101.

Figure 16:
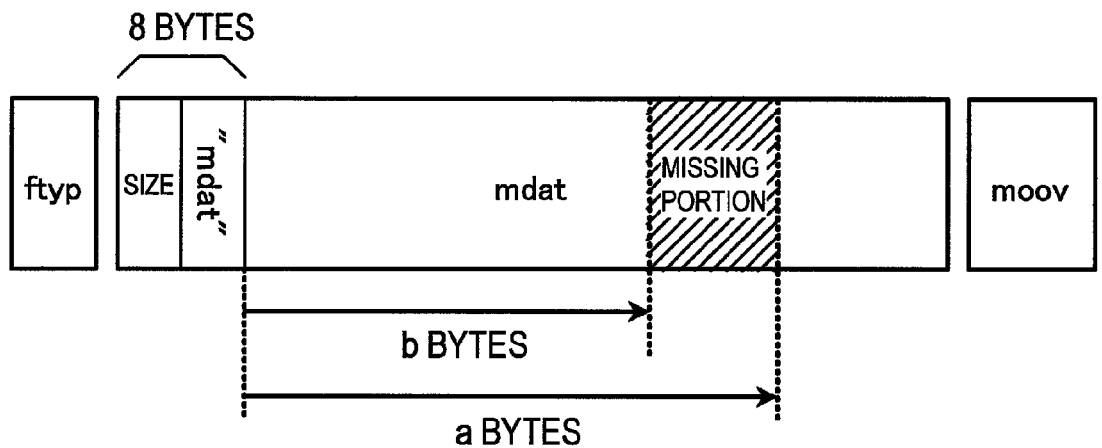
FIG. 16 is a diagram showing the missing portion of the MPEG4 file according to an embodiment.

As described above, the values of the RMIT_SUM recorded in the FREE BOX and the variable CAPTURED_RMIT_SUM when there is a mismatch therebetween are notified from the MPEG4 combining filter 1101 to the MPEG4 rebuilding module 1102. Let us assume that the notified "value of the RMIT_SUM recorded in the FREE BOX" is "a" and the notified "value of the variable CAPTURED_RMIT_SUM" is "b". In this case, it indicates that, among the data of the MPEG4 first format stream generated by the MPEG4 rebuilding module 1102, data from "b+8 bytes" to "a+7 bytes" from the head of the MDAT BOX has become improper data due to the missing (data uniquely generated by the MPEG4 combining filter 1101 in Step 1509 of FIG. 15; for example, data having all zeros). FIG. 16 illustrates the missing portion (hatched portion) of the MPEG4 file. At this time, the MPEG4 rebuilding module 1102 communicates to/from the video camera 1000 via the wireless receiving unit 601, reads only "data from b+8 bytes to a+7 bytes" of the corresponding file recorded in the recording medium 515 by using the host controller 1002 included in the video camera 1000, and overwrites the data in the missing portion. With this operation, even when there is a missing portion in the data due to a communication failure or the like, simply by downloading the minimum data again from the video camera, the object of the system according to the present disclosure, i.e., "to obtain exactly the same data as the video file recorded in the recording medium 515 of the video camera 1000 in units of bit also in the recording medium 613 of the receiving apparatus 1100" can be achieved.

The host controller 1002 and the host controller 513 are illustrated as separate components in FIG. 10, but this is merely an example. Because both a read process and a write process can be performed using a single host controller, the host controller 1002 and the host controller 513 can be integrated.

Figure 17:
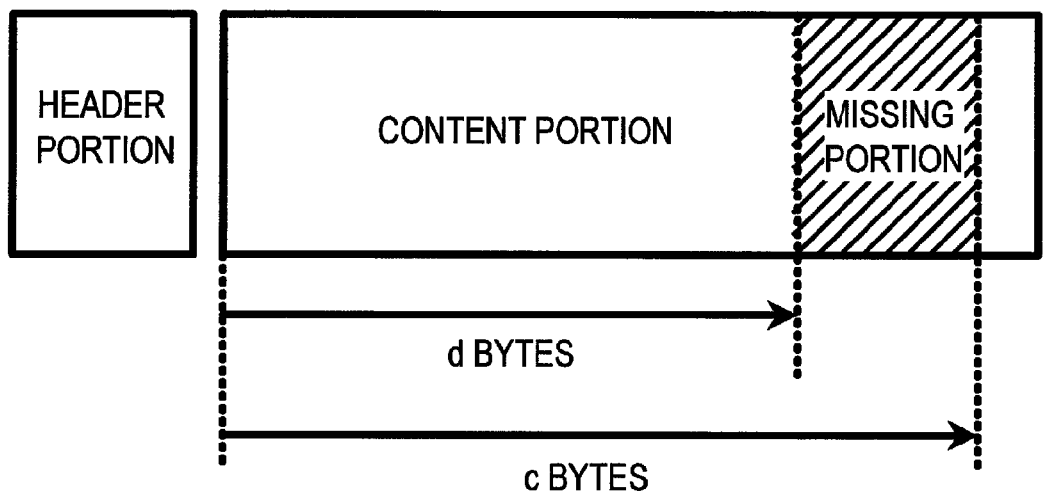
FIG. 17 is a diagram showing the missing portion of the metafile according to an embodiment.

An operation of the metafile extracting module 1103 that is notified of the value of the RMIT_SUM recorded in the FREE BOX and the value of the variable CAPTURED_RMIT_SUM is the same as described above. When "the value of the RMIT_SUM recorded in the FREE BOX" is "c" and "the value of the variable CAPTURED_RMIT_SUM" is "d", it indicates that, among the data of the metafile generated by the metafile extracting module 1103, data from "d bytes" to "c−1 bytes" from the head of the content portion has become improper data due to the missing. FIG. 17 illustrates the missing portion (hatched portion) of the metafile.

The metafile extracting module 1103 communicates to/from the video camera 1000 via the wireless receiving unit 601, reads only "data from d bytes to c−1 bytes" of the corresponding metafile recorded in the recording medium 515 by using the host controller 1002 included in the video camera 1000, and overwrites the data in the missing portion. With this operation, for the metafile as well, even when there is a missing portion in the data due to a communication failure or the like, simply by downloading the minimum data again from the video camera, the object of the system according to the present disclosure, i.e., "to obtain exactly the same data as the video file recorded in the recording medium 515 of the video camera 1000 in units of bit also in the recording medium 613 of the receiving apparatus 1100" can be achieved.

[3. Summary and Effect, etc.]

According to one embodiment, there is provided a recording apparatus 500 for recording video data and audio data in a recording medium in an MPEG4 file format, the recording apparatus comprising: a transmitting unit 514; a first MPEG4 file format generating circuit 507 configured to generate MPEG4 data including multiplexing information of the video data and the audio data having stored in a MOOV BOX in the MPEG4 file format; a second MPEG4 file format generating circuit 508 configured to: generate MPEG4 data including the multiplexing information having stored in a MOOF BOX in the MPEG4 file format; store reproduction information required for reproducing the MPEG4 data generated by the first MPEG4 file format generating circuit from the generated MPEG4 data in a BOX in the MPEG4 file format for storing type of data that is ignored at a time of playing; and output the MPEG4 data to an external apparatus via the transmitting unit; and a controller 513 configured to record the MPEG4 data generated by the first MPEG4 file format generating circuit in a recording medium.

With the recording apparatus according to one embodiment, for example, the second MPEG4 file format generating circuit is configured to generate MPEG4 data including the reproduction information having stored in any one of a FREE BOX and a SKIP BOX of the MPEG4 file format.

With the recording apparatus according to one embodiment, for example, the second MPEG4 file format generating circuit is configured to store the MOOV BOX generated by the first MPEG4 file format generating circuit as the reproduction information in the any one of the FREE BOX and the SKIP BOX.

With the recording apparatus according to one embodiment, for example, the transmitting unit is configured to divide the MPEG4 data generated by the second MPEG4 file format generating circuit into a plurality of pieces of data, and to transmit the plurality of divided pieces of data to the external apparatus 600.

With the recording apparatus according to one embodiment, for example, the transmitting unit is configured to add at least one pair of a MOOF BOX and a MDAT BOX extracted from the MPEG4 data generated by the second MPEG4 file format generating circuit to an FTYP BOX and a MOOV BOX of the MPEG4 data generated by the second MPEG4 file format generating circuit.

With the recording apparatus according to one embodiment, for example, the transmitting unit is configured to store information on a total size of MDAT BOXes of the MPEG4 data that have been transmitted to the external apparatus in the FREE BOX and add to a divided MPEG4 file.

With the recording apparatus according to one embodiment, for example, the transmitting unit is configured to store information on a total size of MDAT BOXes that have been transmitted to the external apparatus in the SKIP BOX, and to add to a divided MPEG4 file.

With the recording apparatus according to one embodiment, for example, the controller is configured to record the video data and the audio data in the recording medium as a movie file, and to further record information pertaining to one of the video data and the audio data as a metafile separately from the movie file; and the second MPEG4 file format generating circuit is configured to store content of the metafile in the BOX for storing the types of data that are ignored at a time of playing, and to output to the external apparatus via the transmitting unit.

With the recording apparatus according to one embodiment, for example, the second MPEG4 file format generating circuit is configured to generate MPEG4 data including the content of the metafile having stored in any one of the FREE BOX and the SKIP BOX of the MPEG4 file format having stored therein the reproduction information.

With the recording apparatus according to one embodiment, for example, the content of the metafile comprises information of a time code.

With the recording apparatus according to one embodiment, for example, the content of the metafile comprises information of latitude and longitude of a location, at which a video pertaining to the video data is recorded.

With the recording apparatus according to one embodiment, for example, the transmitting unit is configured to store information on a total size of metafiles having been transmitted to the external apparatus in the any one of the FREE BOX and the SKIP BOX of the MPEG4 file format having stored therein the reproduction information.

According to one embodiment, there is provided a recording apparatus 600 for recording data in a recording medium in an MPEG4 file format, wherein MPEG4 data is built in at least a first format in the MPEG4 file format, the recording apparatus comprising: a receiving unit 601 configured to receive the second format MPEG4 data; an interpreting circuit 606 configured to detect whether or not reproduction information for reproducing the first format MPEG4 data from the second format MPEG4 data is stored in a BOX for storing a type of data that is ignored at a time of playing included in the MPEG4 data; a first module 609 configured to extract, when the interpreting circuit detects that the reproduction information is stored, BOX data for building the first format MPEG4 data from the reproduction information; a second module 611 configured to build the first format MPEG4 data from the second format MPEG4 data by using the BOX data; and a controller 612 configured to record the first format MPEG4 data in the recording medium.

With the recording apparatus according to one embodiment, for example, the interpreting circuit is configured to detect whether or not the reproduction information is stored in any one of a FREE BOX and a SKIP BOX in the MPEG4 file format.

With the recording apparatus according to one embodiment, for example, the BOX of the MPEG4 data has multiplexing information of video data and audio data stored therein; and the first module is configured to extract the multiplexing information as the reproduction information.

With the recording apparatus according to one embodiment, for example, the BOX of the MPEG4 data includes a MOOV BOX configured to store the multiplexing information of the video data and the audio data.

With the recording apparatus according to one embodiment, for example, the recording apparatus further comprising a third module 610 configured to extract metadata, wherein: the MPEG4 data includes video data and audio data; the interpreting circuit is configured to detect whether or not metadata pertaining to at least one of the video data and the audio data is stored in the BOX of the MPEG4 data; the third module is configured to extract the metadata when the interpreting circuit detects that the metadata is stored; and the controller is configured to further record the metadata in the recording medium.

With the recording apparatus according to one embodiment, for example, the interpreting circuit is configured to detect whether or not the metadata is stored in any one of a FREE BOX and a SKIP BOX in the MPEG4 file format.

With the recording apparatus according to one embodiment, for example, the metadata includes a time code pertaining to the video data and the audio data.

With the recording apparatus according to one embodiment, for example, the metadata includes information on latitude and longitude of a location, at which the video data is recorded.

According to one embodiment, there is provided a recording system 100, comprising: a first recording apparatus 500 configured to record video data and audio data in a recording medium in an MPEG4 file format; and a second recording apparatus 600 configured to store data in a recording medium in the MPEG4 file format, wherein: MPEG4 data is built in at least a first format in the MPEG4 file format; the first recording apparatus includes: a transmitting unit; a first MPEG4 file format generating circuit configured to generate the MPEG4 data including multiplexing information of the video data and the audio data stored in a MOOV BOX in the MPEG4 file format; a second MPEG4 file format generating circuit configured to: generate the MPEG4 data including the multiplexing information stored in a MOOF BOX in the MPEG4 file format; store reproduction information required for reproducing the MPEG4 data generated by the first MPEG4 file format generating circuit from the generated MPEG4 data in the BOX in the MPEG4 file format for storing the type of data that is ignored at the time of playing; and output the MPEG4 data to an external apparatus via the transmitting unit; and a first controller configured to record the MPEG4 data generated by the first MPEG4 file format generating circuit in a recording medium; the second recording apparatus includes: a receiving unit configured to receive the second format MPEG4 data; an interpreting circuit configured to detect whether or not the reproduction information for reproducing the first format MPEG4 data from the second format MPEG4 data is stored in the BOX for storing a type of data that is ignored at a time of playing included in the MPEG4 data; a first module configured to extract, when the interpreting circuit detects that the reproduction information is stored, BOX data for building the first format MPEG4 data from the reproduction information; a second module configured to build the first format MPEG4 data from the second format MPEG4 data by using the BOX data; and a second controller configured to record the first format MPEG4 data in a recording medium; the first controller of the first recording apparatus is configured to record the first format MPEG4 data in a first recording medium 102; the second module of the second recording apparatus is configured to generate the same data as the first format MPEG4 data from the second format MPEG4 data; and the second controller of the second recording apparatus is configured to record the first format MPEG4 data generated by the second module in the second recording medium that is different from the first recording medium 106.

With the recoding apparatus according to the present disclosure, when recording a video (moving image) recorded by a video camera by using, for example, the MPEG4 file format and also recording the video at a transmission destination, a compatibility can be achieved between a file format of the video recorded by the recording apparatus and a file format of the video recorded by an apparatus of the transmission destination. For example, the data of the respective files can be exactly the same.

For example, according to the present disclosure, in a video camera and a PC that is connected to the video camera via the wireless LAN, both a need for viewing the video recorded by the video camera on the PC in real time and a need for simultaneously recording exactly the same video file as the video file recorded in the built-in recording medium of the video camera in the PC can be simultaneously met. In addition, a metafile as well as the video file can be transferred from the video camera to the PC by making a pairing with the corresponding video file clear. Because the MPEG4 file format used for transmitting the video file in the present disclosure complies with the MPEG4 second format, the video file can be played on a general video file player, and hence the user friendliness can be enhanced.

As described above, the exemplary embodiments have been described as examples of the technology in the present disclosure. To this end, the accompanying drawings and the detailed description have been provided.

Therefore, the components described in the accompanying drawings and the detailed description may include not only the components that are essential for solving the problems but also the components that are not essential to solve the problems but used to exemplify the above-mentioned technology. Accordingly, it should not be construed that those inessential components are essential to the present disclosure simply because the inessential components are illustrated and described in the accompanying drawings and the detailed description.

In addition, because the above-mentioned embodiments are described to exemplify a technology in the present disclosure, various modifications, replacements, additions, and omissions may be made without departing from the spirit or scope of the general inventive concept as defined by the appended claims and their equivalents.

The present disclosure is applicable to a video camera that is configured to record a video file and simultaneously transfer the video data to an external apparatus in real time. Further, the present disclosure is applicable to a receiving apparatus that is configured to play video data in real time while receiving the video data and simultaneously record the video data as a file.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2012-073216 filed on Mar. 28, 2012 and No. 2013-045751 filed on Mar. 7, 2013, the entire contents of which are hereby incorporated by reference.

What is claimed is:

1. A recording apparatus for recording video data and audio data in a recording medium in an MPEG4 file format, the recording apparatus comprising:
   a transmitting unit;
   a first MPEG4 file format generating circuit configured to generate first MPEG4 data including multiplexing information of the video data and the audio data having stored in a MOOV BOX in the MPEG4 file format;
   a second MPEG4 file format generating circuit configured to:
      store reproduction information required for reproducing the first MPEG4 data from MPEG4 data including the multiplexing information having stored in a MOOF BOX in the MPEG4 file format in a BOX in the MPEG4 file format for storing type of data that is ignored at a time of playing;
      generate second MPEG4 data including both the MPEG4 data and the BOX for storing type of data that is ignored at a time of playing; and
      output the second MPEG4 data to an external apparatus via the transmitting unit; and
   a controller configured to record the MPEG4 data generated by the first MPEG4 file format generating circuit in a recording medium.

2. The recording apparatus according to claim 1, wherein the second MPEG4 file format generating circuit is configured to generate MPEG4 data including the reproduction information having stored in any one of a FREE BOX and a SKIP BOX of the MPEG4 file format.

3. The recording apparatus according to claim 2, wherein the second MPEG4 file format generating circuit is configured to store the MOOV BOX generated by the first MPEG4 file format generating circuit as the reproduction information in the any one of the FREE BOX and the SKIP BOX.

4. The recording apparatus according to claim 1, wherein the transmitting unit is configured to divide the MPEG4 data generated by the second MPEG4 file format generating circuit into a plurality of pieces of data, and to transmit the plurality of divided pieces of data to the external apparatus.

5. The recording apparatus according to claim 4, wherein the transmitting unit is configured to add at least one pair of a MOOF BOX and a MDAT BOX extracted from the MPEG4 data generated by the second MPEG4 file format generating circuit to an FTYP BOX and a MOOV BOX of the MPEG4 data generated by the second MPEG4 file format generating circuit.

6. The recording apparatus according to claim 4, wherein the transmitting unit is configured to store information on a total size of MDAT BOXes of the MPEG4 data that have been transmitted to the external apparatus in the FREE BOX and add to a divided MPEG4 file.

7. The recording apparatus according to claim 4, wherein the transmitting unit is configured to store information on a total size of MDAT BOXes that have been transmitted to the external apparatus in the SKIP BOX, and to add to a divided MPEG4 file.

8. The recording apparatus according to claim 1, wherein:
   the controller is configured to record the video data and the audio data in the recording medium as a movie file, and to further record information pertaining to one of the video data and the audio data as a metafile separately from the movie file; and
   the second MPEG4 file format generating circuit is configured to store content of the metafile in the BOX for storing the types of data that are ignored at a time of playing, and to output to the external apparatus via the transmitting unit.

9. The recording apparatus according to claim 8, wherein the second MPEG4 file format generating circuit is configured to generate MPEG4 data including the content of the metafile having stored in any one of the FREE BOX and the SKIP BOX of the MPEG4 file format having stored therein the reproduction information.

10. The recording apparatus according to claim 8, wherein the content of the metafile comprises information of a time code.

11. The recording apparatus according to claim 8, wherein the content of the metafile comprises information of latitude and longitude of a location, at which the video data is recorded.

12. The recording apparatus according to claim 9, wherein the transmitting unit is configured to store information on a total size of metafiles having been transmitted to the external apparatus in the any one of the FREE BOX and the SKIP BOX of the MPEG4 file format having stored therein the reproduction information.

13. A recording apparatus for recording data in a recording medium in an MPEG4 file format, wherein MPEG4 data is built in at least a first format in the MPEG4 file format, the recording apparatus comprising:
   a receiving unit configured to receive a second format MPEG4 data including multiplexing information having stored in a MOOF BOX in the MPEG4 file format;
   an interpreting circuit configured to detect whether or not reproduction information for reproducing the first format MPEG4 data from the second format MPEG4 data is stored in a BOX for storing a type of data that is ignored at a time of playing included in the MPEG4 data where the BOX is included in the second format MPEG4 data;
   a first module configured to extract, when the interpreting circuit detects that the reproduction information is stored, BOX data for building the first format MPEG4 data from the reproduction information;
   a second module configured to build the first format MPEG4 data from the second format MPEG4 data by using the BOX data; and a controller configured to record the first format MPEG4 data including multiplexing information having stored in a MOOV BOX in the MPEG4 file format in the recording medium.

14. The recording apparatus according to claim 13, wherein the interpreting circuit is configured to detect whether or not the reproduction information is stored in any one of a FREE BOX and a SKIP BOX in the MPEG4 file format.

15. The recording apparatus according to claim 13, wherein:
the BOX of the MPEG4 data has multiplexing information of video data and audio data stored therein; and
the first module is configured to extract the multiplexing information as the reproduction information.

16. The recording apparatus according to claim 15, wherein the BOX of the MPEG4 data includes a MOOV BOX configured to store the multiplexing information of the video data and the audio data.

17. The recording apparatus according to claim 13, further comprising a third module configured to extract metadata, wherein:
the MPEG4 data includes video data and audio data;
the interpreting circuit is configured to detect whether or not metadata pertaining to at least one of the video data and the audio data is stored in the BOX of the MPEG4 data;
the third module is configured to extract the metadata when the interpreting circuit detects that the metadata is stored; and
the controller is configured to further record the metadata in the recording medium.

18. The recording apparatus according to claim 17, wherein the interpreting circuit is configured to detect whether or not the metadata is stored in any one of a FREE BOX and a SKIP BOX in the MPEG4 file format.

19. The recording apparatus according to claim 18, wherein the metadata includes a time code pertaining to the video data and the audio data.

20. The recording apparatus according to claim 18, wherein the metadata includes information on latitude and longitude of a location, at which the video data is recorded.

21. A recording system, comprising:
a first recording apparatus configured to record video data and audio data in a recording medium in an MPEG4 file format; and
a second recording apparatus configured to store data in a recording medium in the MPEG4 file format, wherein:
MPEG4 data is built in at least a first format in the MPEG4 file format;
the first recording apparatus includes:
a transmitting unit;
a first MPEG4 file format generating circuit configured to generate first MPEG4 data including multiplexing information of the video data and the audio data stored in a MOOV BOX in the MPEG4 file format;
a second MPEG4 file format generating circuit configured to:
store reproduction information required for reproducing the first MPEG4 data from MPEG4 data including the multiplexing information having stored in a MOOF BOX in the MPEG4 file format in the BOX in the MPEG4 file format for storing the type of data that is ignored at the time of playing;
generate second MPEG4 data including both the MPEG4 data and the BOX for storing type of data that is ignored at a time of playing; and
output the second MPEG4 data to an external apparatus via the transmitting unit; and
a first controller configured to record the MPEG4 data generated by the first MPEG4 file format generating circuit in a recording medium;
the second recording apparatus includes:
a receiving unit configured to receive the second format MPEG4 data;
an interpreting circuit configured to detect whether or not the reproduction information for reproducing the first format MPEG4 data from the second format MPEG4 data is stored in the BOX for storing a type of data that is ignored at a time of playing included in the MPEG4 data where the BOX is included in the second format MPEG4 data;
a first module configured to extract, when the interpreting circuit detects that the reproduction information is stored, BOX data for building the first format MPEG4 data from the reproduction information;
a second module configured to build the first format MPEG4 data from the second format MPEG4 data by using the BOX data; and
a second controller configured to record the first format MPEG4 data in a recording medium;
the first controller of the first recording apparatus is configured to record the first format MPEG4 data in a first recording medium;
the second module of the second recording apparatus is configured to generate the same data as the first format MPEG4 data from the second format MPEG4 data; and
the second controller of the second recording apparatus is configured to record the first format MPEG4 data generated by the second module in the second recording medium that is different from the first recording medium.

* * * * *